(12) United States Patent
Chern

(10) Patent No.: US 10,119,243 B2
(45) Date of Patent: Nov. 6, 2018

(54) ROAD GRADER IMPLEMENT WITH STORABLE AND DEPLOYABLE BLADE

(71) Applicant: Golden View Fabricating Ltd., Smoky Lake (CA)

(72) Inventor: Bruce Alexander Chern, Smoky Lake (CA)

(73) Assignee: Golden View Fabricating Ltd, Smoky Lake, Alberta ( * ) Notice: Subject to any disclaimer, the term of this patent is extended or adjusted under 35 U.S.C. 154(b) by 0 days.

(21) Appl. No.: 15/595,504

(22) Filed: May 15, 2017

(65) Prior Publication Data

US 2017/0328028 A1  Nov. 16, 2017

Related U.S. Application Data

(60) Provisional application No. 62/336,235, filed on May 13, 2016.

(51) Int. Cl.
| | |
|---|---|
| *E02F 3/76* | (2006.01) |
| *E02F 3/815* | (2006.01) |
| *E02F 9/08* | (2006.01) |
| *A01B 29/00* | (2006.01) |

(Continued)

(52) U.S. Cl.
CPC ............ *E02F 3/7677* (2013.01); *A01B 29/00* (2013.01); *E02F 3/7663* (2013.01); *E02F 3/7668* (2013.01); *E02F 3/7672* (2013.01); *E02F 3/7681* (2013.01); *E02F 3/7686* (2013.01); *E02F 3/8155* (2013.01); *E02F 9/0883* (2013.01); *E02F 3/961* (2013.01); *E02F 9/18* (2013.01)

(58) Field of Classification Search
CPC ...... E02F 3/7631; E02F 3/7681; E02F 3/7686
USPC ............ 172/223, 654, 656, 667, 684.5, 793, 172/799.5; 37/268, 274
See application file for complete search history.

(56) References Cited

U.S. PATENT DOCUMENTS

| | | |
|---|---|---|
| D987,803 | 3/1911 | Hickok |
| 1,093,814 A | 4/1914 | Whittemore |
| 1,339,548 A | 5/1920 | Cox |

(Continued)

FOREIGN PATENT DOCUMENTS

CA    2448635    5/2005

*Primary Examiner* — Gary S Hartmann
(74) *Attorney, Agent, or Firm* — Kyle R Satterthwaite; Ryan W Dupuis; Ade & Company Inc.

(57) ABSTRACT

A grading implement features a frame with at least one movable section carried by a main frame section. Each movable section is movable relative thereto between a storage position and a working position reaching further laterally outward from the main section to increase a working width of the implement. An underside of each movable section features a respective blade adjustably mounted thereto for selective adjustment between different relative blade positions relative to the movable section. One embodiment features outboard blades on two movable sections, inboard blades on another two movable sections, and a rear blade mounted centrally on the main section behind the inboard and outboard blades. A dust suppression system features spray nozzles distributed across the main frame section behind the blades, and storage tanks mounted atop the main section so that weight of the dust suppression agent provides extra downforce to the blades.

19 Claims, 18 Drawing Sheets

(51) Int. Cl.
*E02F 3/96* (2006.01)
*E02F 9/18* (2006.01)

(56) References Cited

U.S. PATENT DOCUMENTS

| | | | |
|---|---|---|---|
| 1,381,709 A | | 6/1921 | Herring |
| 1,507,552 A | | 9/1924 | Adams et al. |
| 1,537,091 A | | 5/1925 | Snyder et al. |
| 1,756,329 A | | 4/1930 | Andrew |
| 2,050,282 A | | 8/1936 | Dillard |
| 2,312,255 A | | 2/1943 | Lowdermilk |
| 2,615,264 A | | 10/1952 | Satterthwaite |
| 2,646,633 A | * | 7/1953 | Jahn ............... E02F 3/7659 172/782 |
| 2,787,846 A | | 4/1957 | Everds et al. |
| 3,203,120 A | | 8/1965 | Burton |
| 3,216,337 A | * | 11/1965 | MacDonald ........... E01C 19/15 37/280 |
| 3,435,546 A | * | 4/1969 | Iverson ................ E02F 3/764 172/4.5 |
| RE31,045 E | * | 10/1982 | Essell ................. E01H 5/065 172/777 |
| 4,369,847 A | * | 1/1983 | Mizunuma ............. E02F 3/815 172/701.1 |
| 4,379,653 A | * | 4/1983 | Brown ................ E01C 19/4853 404/104 |
| 4,700,786 A | | 10/1987 | Berry |
| 4,936,392 A | * | 6/1990 | Kitchin .................. E02F 3/769 172/815 |
| 5,199,196 A | | 4/1993 | Straley |
| 5,330,287 A | | 7/1994 | Constantin |
| 5,392,538 A | * | 2/1995 | Geerligs ................ E01H 5/061 37/236 |
| 5,427,185 A | | 6/1995 | Seal |
| 5,515,623 A | | 5/1996 | Weeks |
| 5,890,546 A | | 4/1999 | Kerpash, Sr. |
| 6,119,792 A | | 9/2000 | Almer |
| 6,283,225 B1 | | 9/2001 | Hermonson |
| 6,308,785 B1 | | 10/2001 | Rhoden |
| 6,419,030 B1 | | 7/2002 | Turner |
| 6,877,258 B2 | * | 4/2005 | Frey ........................ E01H 5/06 37/274 |
| 7,600,576 B2 | | 10/2009 | Gayer |
| 7,681,337 B2 | * | 3/2010 | Watson .................. E01H 5/065 37/274 |
| 9,739,031 B2 | * | 8/2017 | Miller ................... E02F 3/8155 |
| 2006/0118313 A1 | | 6/2006 | Nicholas |
| 2007/0137872 A1 | | 6/2007 | Ziebell |

* cited by examiner

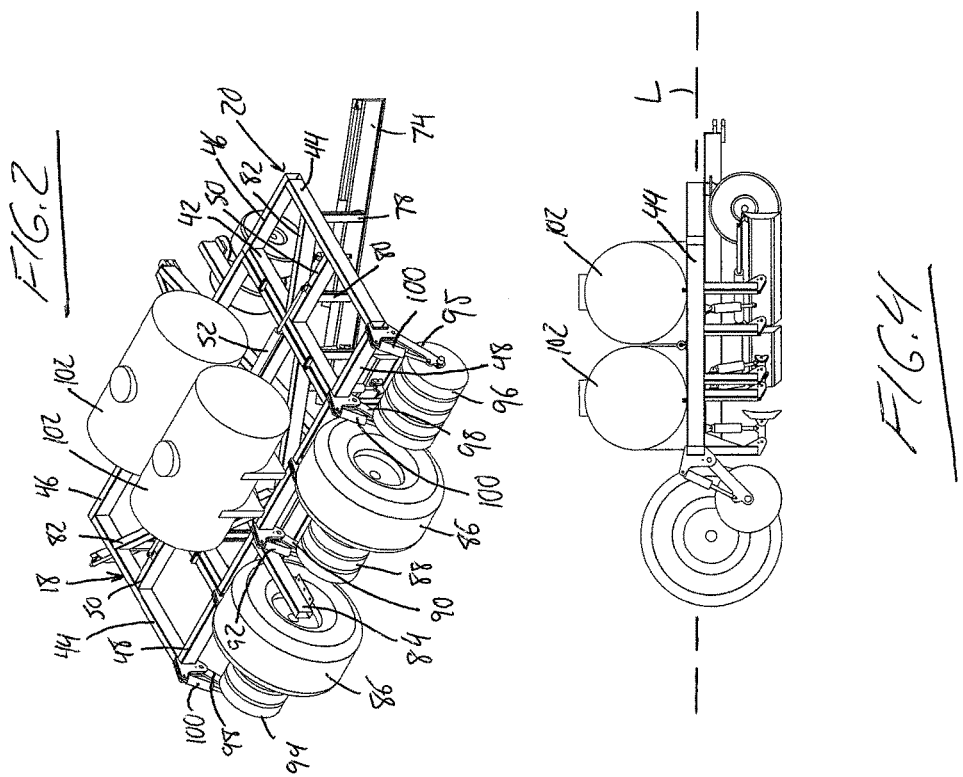

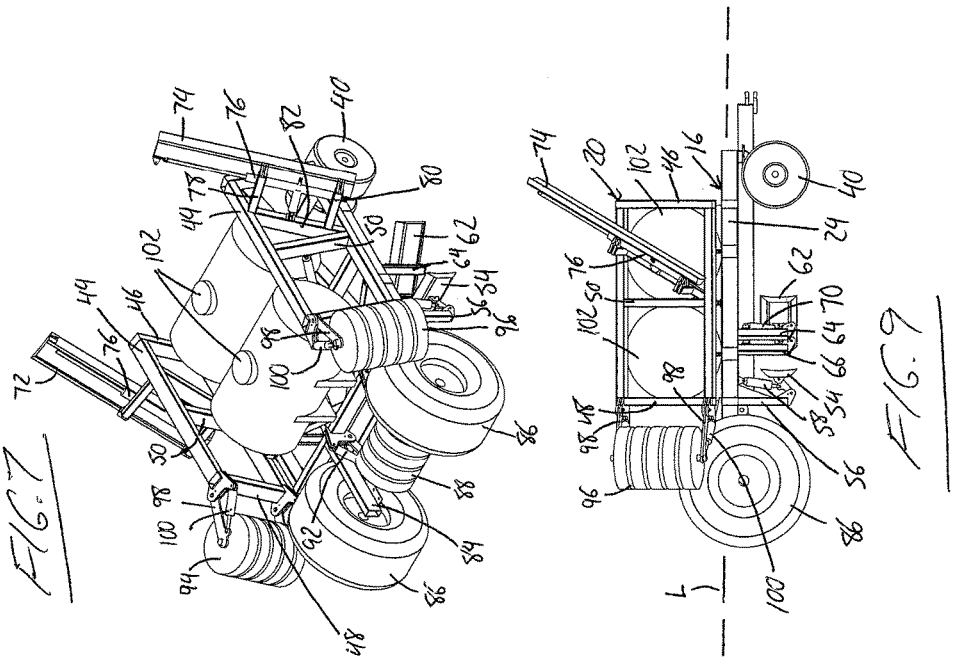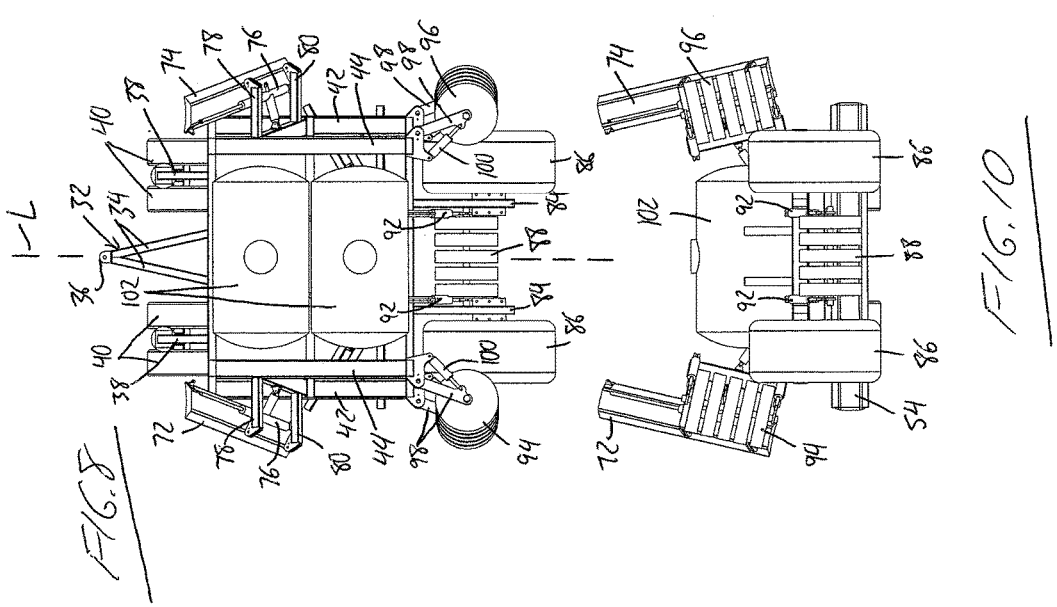

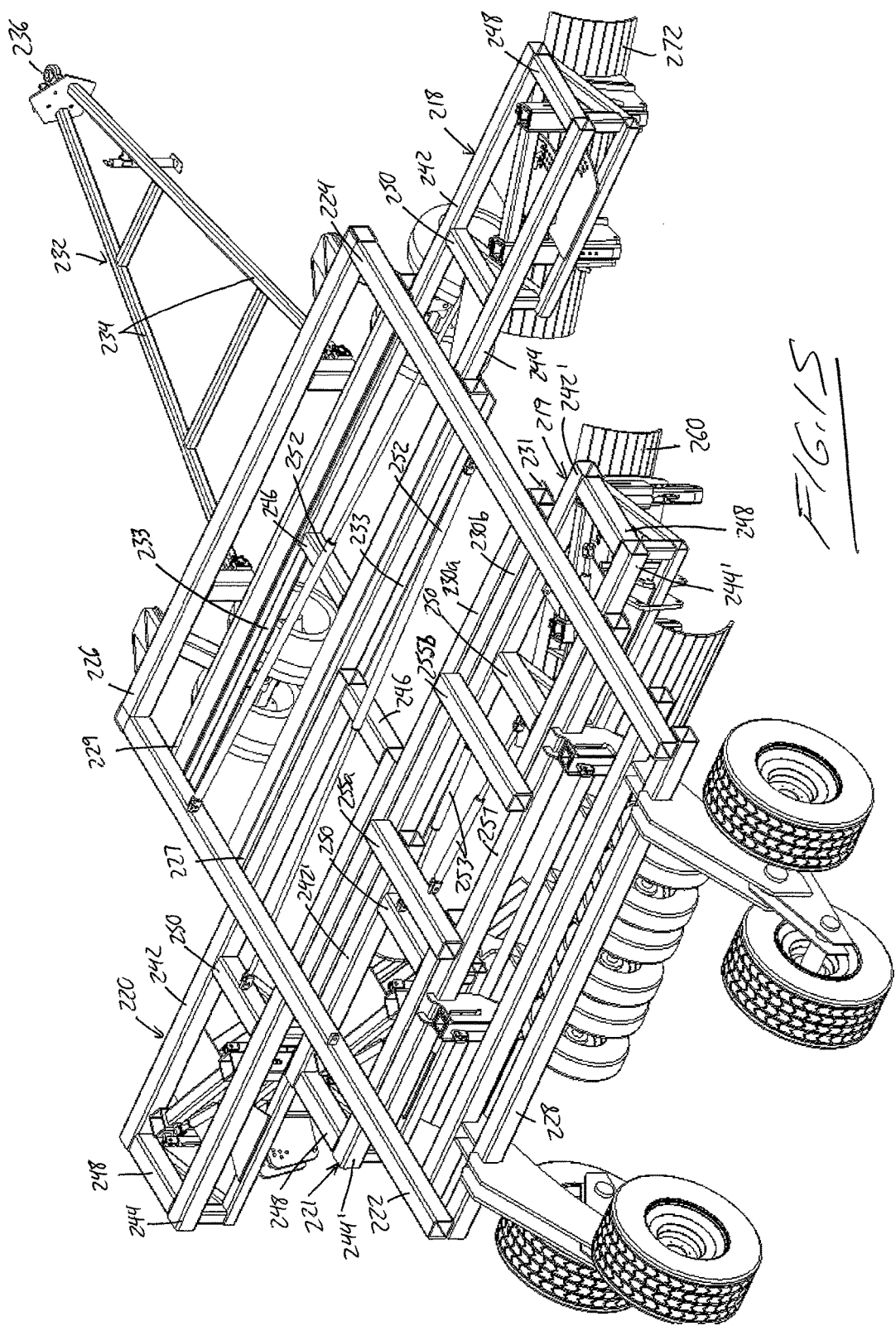

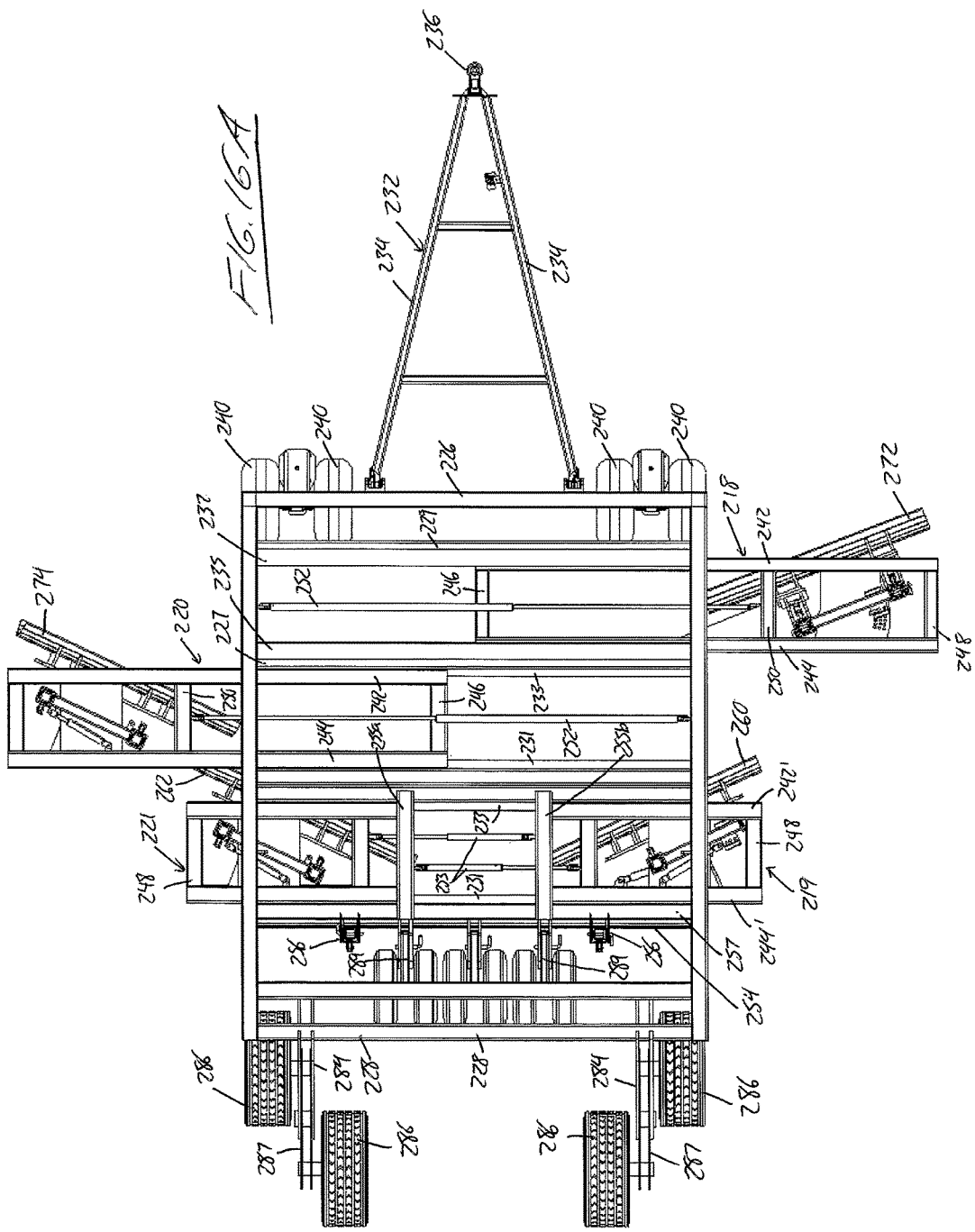

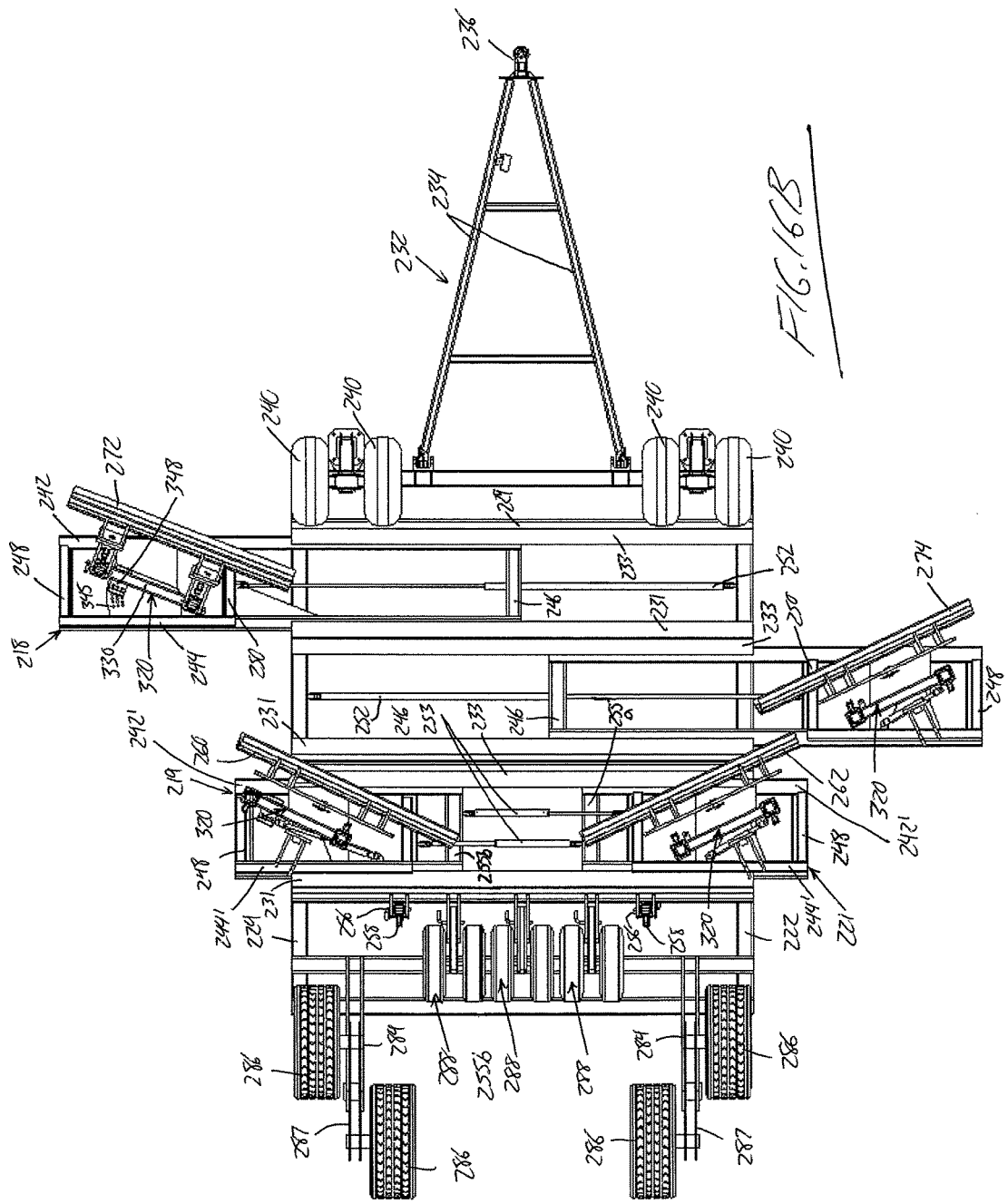

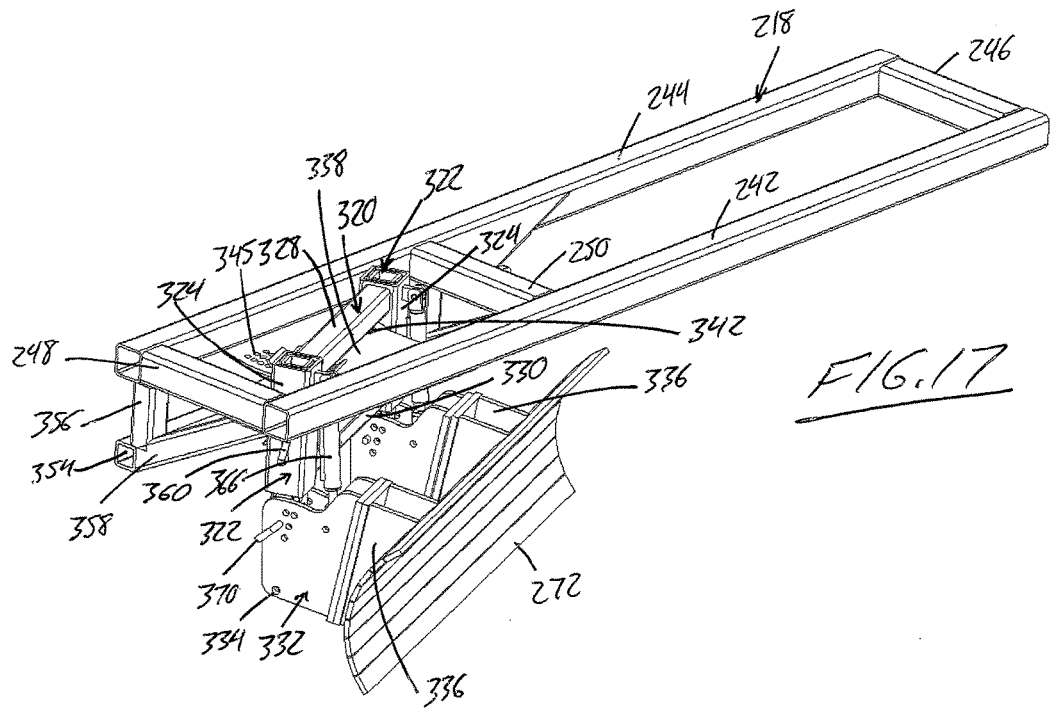

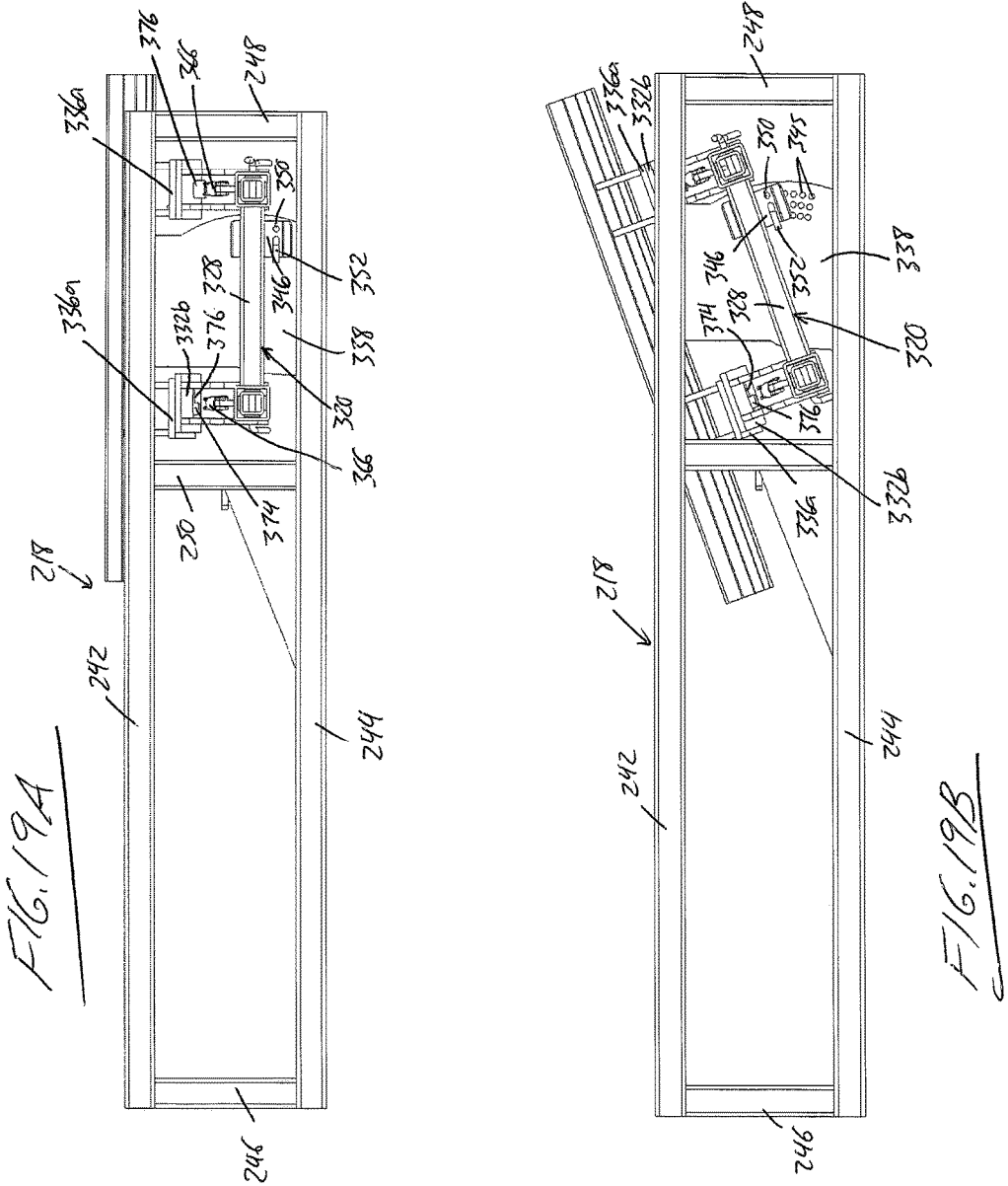

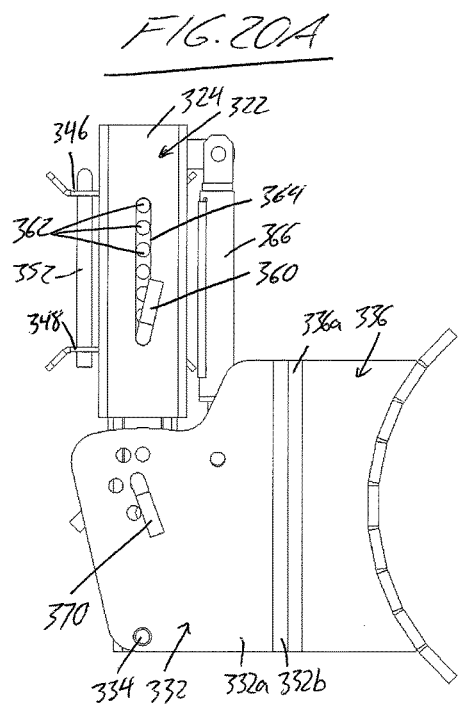

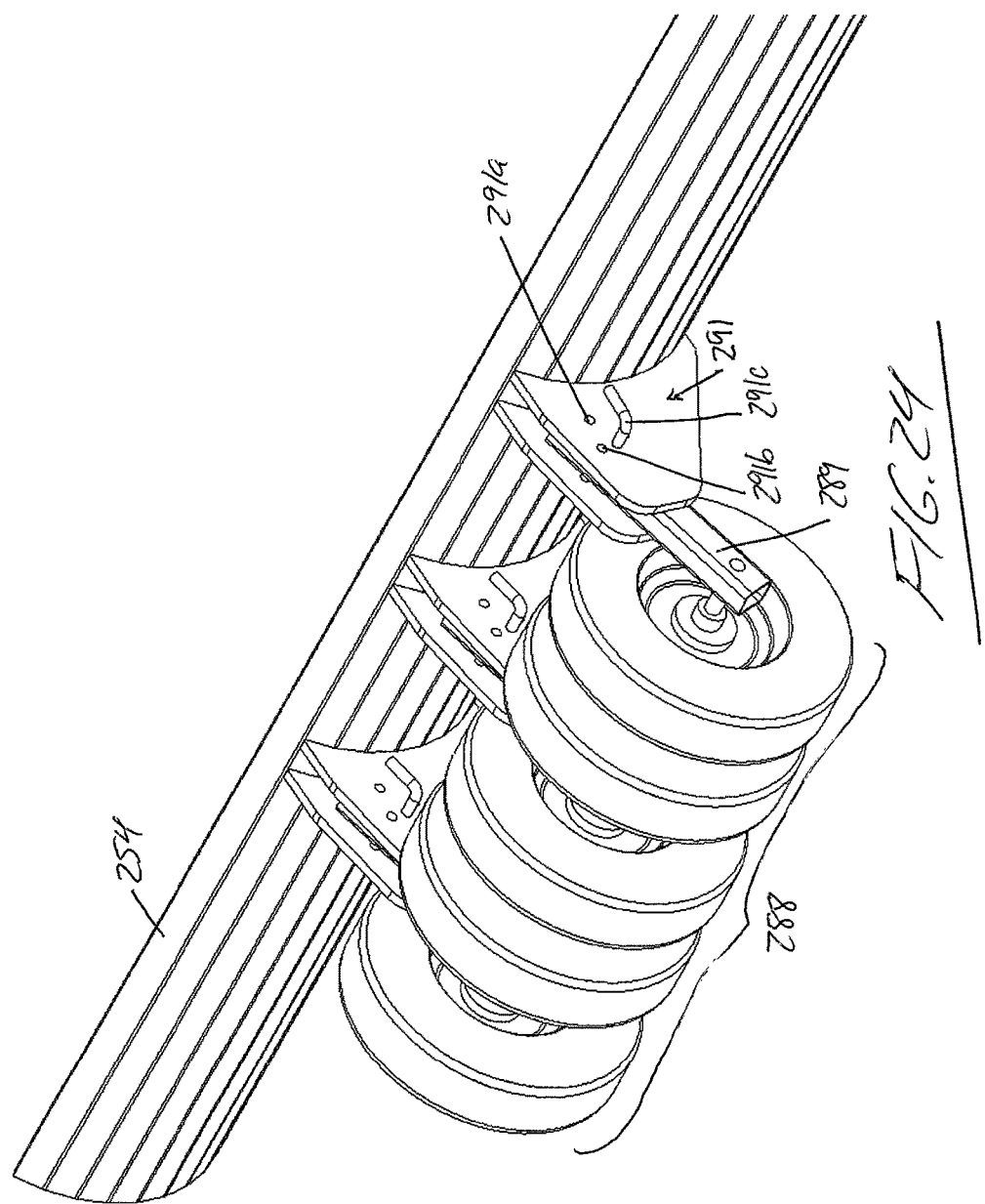

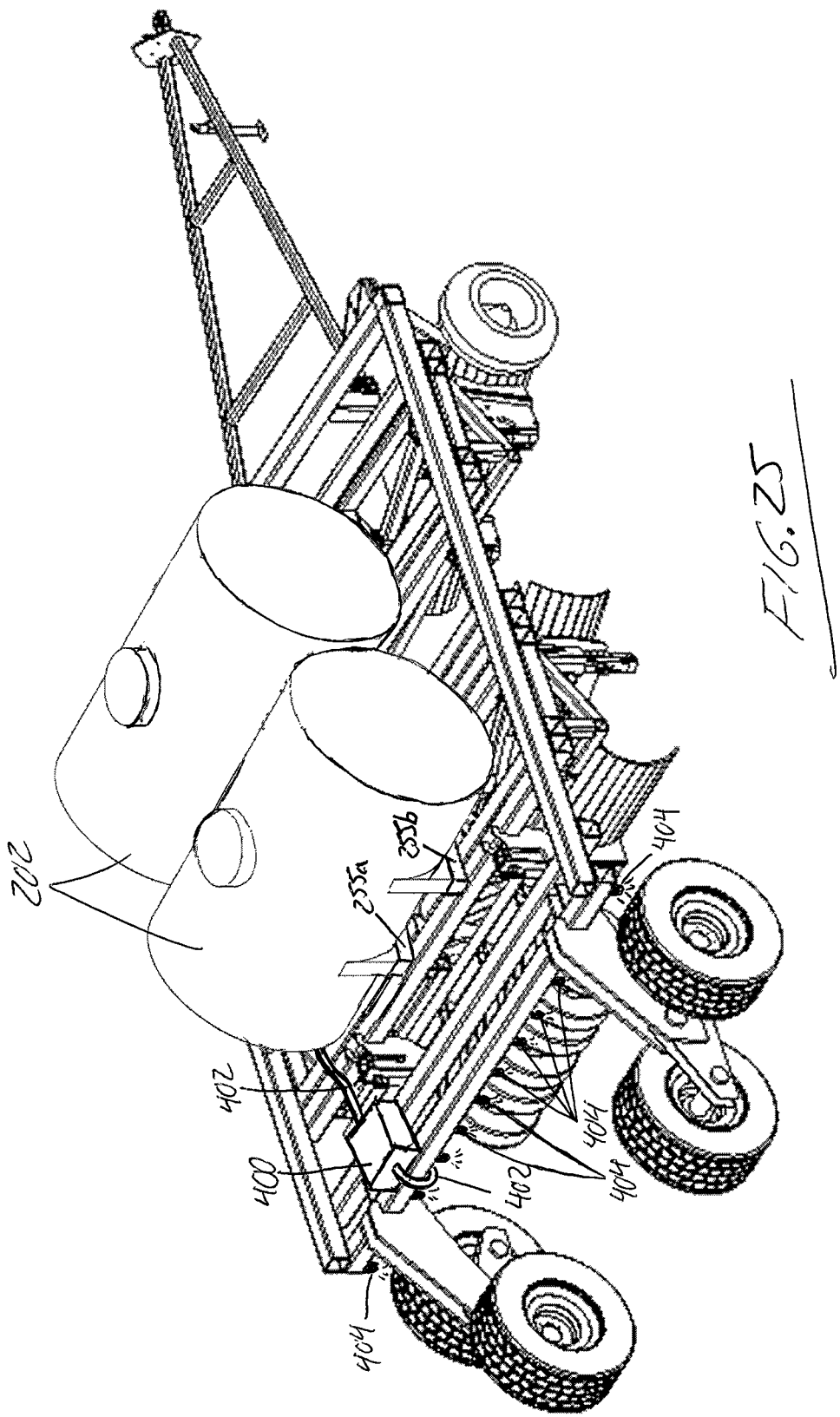

ROAD GRADER IMPLEMENT WITH STORABLE AND DEPLOYABLE BLADE

CROSS REFERENCE TO RELATED APPLICATIONS

This application claims benefit under 35 U.S.C. 119(e) of Provisional Application Ser. No. 62/336,235, filed May 13, 2016.

FIELD OF THE INVENTION

The present invention relates generally to road graders, and more particularly to a towed road grader implement with deployable/stowable blade-carrying frame sections by which the working width of the implement is adjustable to suit various applications, including single-pass grading operations, while an on-board dust suppression system improves working conditions during use of the implement.

BACKGROUND

A wide variety of road grader implements are known in the prior art, and include implements with dual blades of adjustable inclination angle allowing both sides of a crowned road surface to be graded in one pass, and/or blades of adjustable working position or length to increase the effective overall working width of the implement during a single pass.

Examples of bladed implements with such blade adjustments can be found in U.S. Pat. Nos. 1,537,091, 2,050,282, 5,427,185 and 6,308,785 and in U.S. Patent Application Publication No. 2006/0118313. Other blade equipped implements for grading or other ground working or ground clearing operations can be found in Canadian Patent 2448635, U.S. Patent Application Publication No. 2007/0137872, and U.S. Pat. Nos. 0,987,803, 1,093,814, 1,339,548, 1,381,709, 1,507,552, 1,756,329, 2,312,255, 2,615,264, 2,787,846, 3,203,120, 4,700,786, 5,199,196, 5,330,287, 5,515,623, 5,890,546 6,119,792, 6,283,225, 6,419,030, 6,419,030 and 7,600,576

However, there remains room for improvements and alternatives to these prior designs.

SUMMARY OF THE INVENTION

According to one aspect of the invention, there is provided a grading implement comprising:
a frame comprising:
a main section having a longitudinal direction in which the frame is arranged to be conveyed over a road surface;
at least one movable section carried by the main section and movable relative thereto between a storage position and a working position, said at least one movable section reaching further laterally outward from said main section in the working position than in the storage position; and
a blade arrangement comprising:
at an underside of each movable section that faces downwardly toward the road surface in at least the deployed working position, a respective outboard blade carried by the respective movable section for working engagement of said blade with said road surface, said outboard blade being adjustably mounted to the respective movable section for selective adjustment between different relative blade positions relative to said movable section; and
at least one inboard blade each mounted to the main section of the frame a position that is situated more inboard of the main frame section than each outboard blades each movable sections is deployed in the working position;
wherein the respective outboard blade of each movable section of the frame is mounted thereto entirely separately and independently of each inboard blade mounted to the main section of the frame.

Preferably the at least one movable section of the frame comprises at least two movable sections that reach laterally outward from the main section on opposing sides thereof when deployed in the working positions.

Preferably the at least one movable section of the frame comprises first and second movable sections, and the blade arrangement comprises first and second outboard blades respectively carried by said first and second movable sections.

Preferably the first and second outboard blades are arranged to overlap with the at least one inboard blade when the first and second movable sections are deployed in the working positions.

Preferably the at least one inboard blade comprises third and fourth blades spaced apart from one across a central longitudinal axis of the main section and each residing adjacent a respective side thereof.

Preferably the at least one movable section comprises third and fourth movable sections on which the third and fourth blades are carried for movement of said third and fourth blades between stowed and extended positions corresponding to the storage and working positions of said third and fourth movable sections, said third and fourth blades reaching further laterally outward from said main section in the extended positions than in the stowed positions.

In the working positions, preferably the first and second movable sections reach further laterally outward from the main section than the third and fourth movable sections.

Preferably the first and second movable sections are more offset from one another in the longitudinal direction of the main section than the third and fourth sections.

Preferably the third and fourth movable sections are aligned with one another across the central longitudinal axis main section.

Preferably the first movable section leads the second movable section in the longitudinal direction of the main section.

Preferably the blade arrangement further comprises a rear blade carried by the main section of the frame at an underside thereof in a location trailing the at least one inboard blade and lying cross-wise to the main frame section over at least a majority width thereof.

Preferably there are one or more storage tanks mounted on the frame for containing a dust suppression agent therein, and a dispensing system comprising delivery lines connecting said storage tank to discharge points spaced across the main frame section at a dispensing area thereof for dispensing of said dust suppression agent through said discharge points to the road surface.

Preferably the dispensing area trails the blade arrangement in the longitudinal direction for dispensing of said dust suppression agent to the road surface after said blade arrangement has acted on said road surface.

Preferably at least one of the one or more storage tanks is mounted to the frame in a position overlying at least one blade of the blade arrangement.

Preferably the one or more storage tanks are mounted on the main section of the frame.

Preferably the one or more storage tanks comprises a plurality of storage tanks spaced apart over an area of the frame to spread a collective weight of the dust suppression agent in said plurality of storage tanks over said over said area of the frame.

Preferably the one or more storage tanks include at least one storage tank carried on the main frame section in a position overlying the storage position of at least one of the movable sections of the frame.

Preferably each movable section of the frame comprises a slide-out section.

Preferably each slide-out section is received in a respective guide-track of the main section of the frame for displacement back and forth along said guide-track in lateral direction transverse the longitudinal direction.

Preferably slide-out section comprises a rectangular frame, and the respective guide track comprises support flanges of the main section that lie transverse to the longitudinal direction thereof and on which opposing sides of the rectangular frame of the slide-out section are slidably disposed.

Preferably the respective blade on each movable section is adjustable in yaw angle.

Preferably the respective blade on each movable section is adjustable in pitch angle.

Preferably the respective blade on each movable section is adjustable in roll angle.

Preferably the respective blade on each movable section is adjustable in height.

Preferably the respective blade on each movable section is carried by a blade-holder featuring extendable/collapsible uprights coupled to a backside of the blade at spaced positions therealong, whereby synchronous extension/collapse of said uprights to equal lengths adjusts a height of said blade and differential extension/collapse of said uprights to different lengths adjusts a roll angle of said blade.

Preferably a lower portion of each extendable/collapsible upright carries a respective mounting bracket coupled to the backside of the blade, a respective linear actuator is coupled between an upper portion of the extendable/collapsible upright and the mounting bracket so that extension and collapse of said linear actuator is operable to drive extension and collapse of said extendable/collapsible upright, and one of the mounting brackets is coupled to the blade through a pin and slot joint to accommodate relative motion between the blade and the mounting bracket during adjustment of the blade's roll angle.

Preferably there is a height locking pin for each extendable/collapsible upright that is operable to lock the upper and lower portions of the extendable/collapsible upright together to prevent extension thereof, and a pitch locking pin engagable to the lower portion of the extendable collapsible upright through a pin hole in the mounting bracket to lock a relative angle of the mounting bracket relative to the extendable/collapsible upright, thereby maintaining a corresponding pitch angle of the blade, whereby extension/collapse of the actuator with the height locking pin engaged and the pitch locking pin withdrawn adjusts the pitch angle of the blade, and extension/collapse of the actuator with the pitch locking pin engaged and the height locking pin withdrawn adjusts the height or roll angle of the blade.

Preferably the extendable/collapsible uprights are joined by a cross member that is pivotable about an upright axis passing through a carrier plate over which the cross member spans, said carrier plate having a set of lock pin holes therein arranged about said upright axis for receipt of a yaw lock pin through a selected one of said lock pin holes via a corresponding hole carried on the cross member.

Preferably there is at least one packing roller rollably supported on the frame at a packing area that trails the blade arrangement.

Preferably the at least one packing roller includes a packing roller carried by a blade of the blade arrangement at a backside thereof.

Preferably there is a set of one or more actuators operable to raise and lower the blade that carries said packing roller at the backside thereof, wherein said set of one or more actuators are the only actuators operable to raise and lower said packing roller relative to the frame.

Preferably there is an adjustable connection of said packing roller to the blade by which a height of said packing roller relative to the blade is adjustable.

According to another aspect of the invention, there is provided a grading implement comprising:

a frame having a longitudinal direction in which the frame is arranged to be conveyed over a road surface;

a blade arrangement carried by said frame at an underside thereof to act on an underlying road surface over which the frame is conveyed;

at least one storage tank mounted on the frame for containing a dust suppression agent therein; and a dispensing system comprising delivery lines connecting said storage tank to discharge points spaced across the frame at a dispensing area for dispensing of said dust suppression agent through said discharge points to the road surface over a working width of the blade arrangement.

BRIEF DESCRIPTION OF THE DRAWINGS

Select embodiments of the invention will now be described in conjunction with the accompanying drawings in which:

FIG. 2 is a rear perspective view of the grading implement of FIG. 1 in isolation.

FIG. 3 is an overhead plan view of the grading implement of FIG. 2.

FIG. 4 is a side elevational view of the grading implement of FIG. 2.

FIG. 5 is a rear elevational view of the grading implement of FIG. 2.

FIG. 7 is a rear perspective view of the grading implement of FIG. 6 in isolation.

FIG. 8 is an overhead plan view of the grading implement of FIG. 6.

FIG. 9 is a side elevational view of the grading implement of FIG. 6.

FIG. 10 is a rear elevational view of the grading implement of FIG. 6.

FIG. 15 is a rear side perspective view of the implement of FIG. 14.

FIG. 16A is an overhead plan view of the implement of FIG. 14.

FIG. 16B is a bottom plan view of the implement of FIG. 14.

FIG. 17 is an isolated top front perspective view of one of the blade-carrying slide-out frame sections of the implement of FIG. 11.

FIG. 18 is a bottom rear perspective view of the blade-carrying slide-out frame section of FIG. 17.

FIGS. 19A and 19B are overhead plan views of the blade-carrying slide-out frame section of FIG. 17 with the blade thereof situated at different yaw angles.

FIGS. 20A and 20B are side elevational views of the blade-carrying slide-out frame section of FIG. 17 with the blade thereof situated at different heights.

FIGS. 21A and 21B are side elevational views of the blade-carrying slide-out frame section of FIG. 17 with the blade thereof situated at different pitch angles.

FIG. 24 is an isolated rear perspective view of the rearmost blade and packing rollers from the implement of FIG. 23, with one packing wheel omitted for illustrative purpose.

FIG. 25 is a rear side perspective view of the implement of FIG. 12 featuring addition of a dust suppression system including storage tanks, a pump and dispensing nozzles for a broadcasting a liquid dust suppression agent onto a freshly graded road surface.

In the drawings like characters of reference indicate corresponding parts in the different figures.

DETAILED DESCRIPTION

Figure 1:
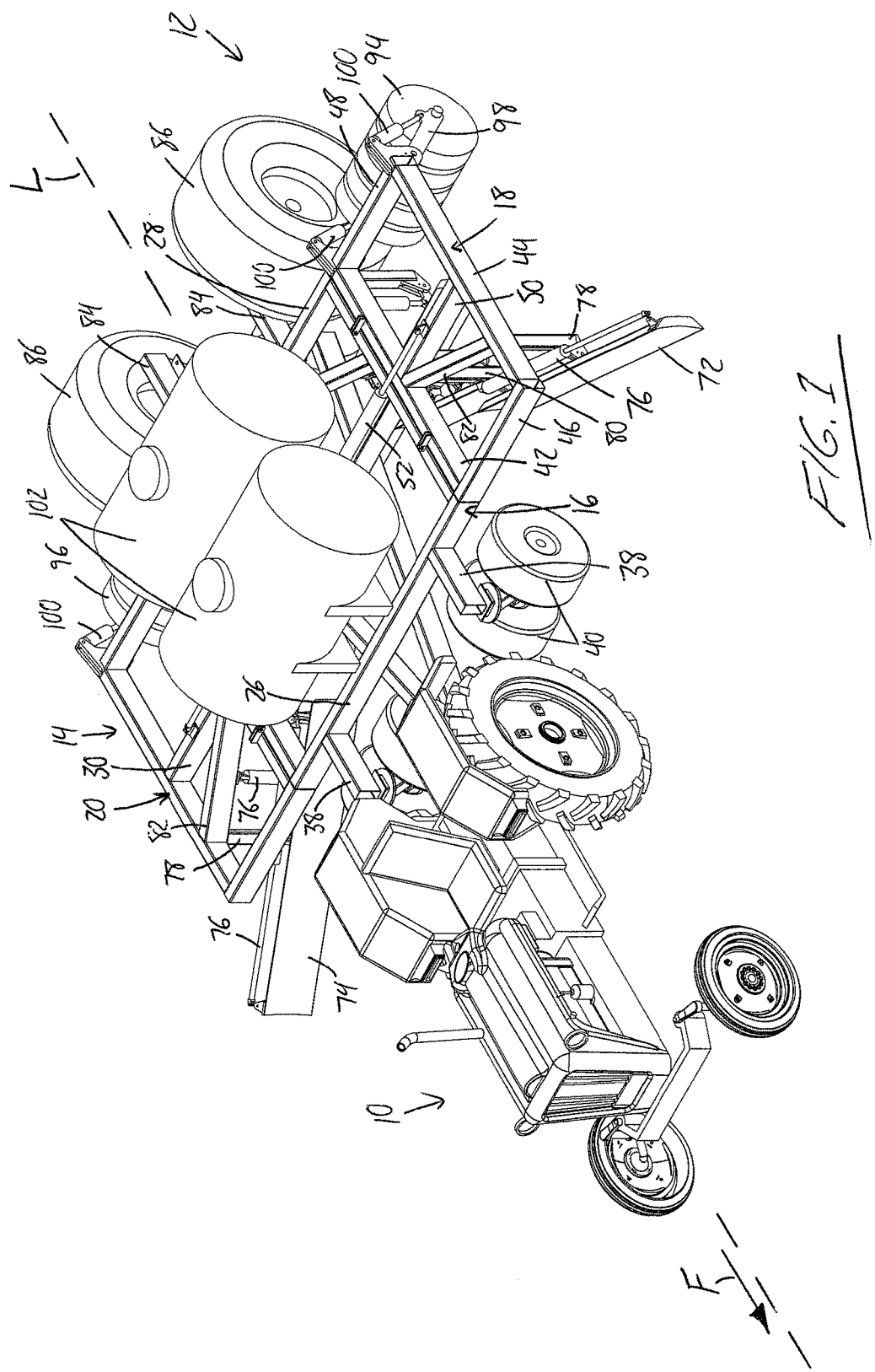
FIG. 1 is a front perspective view of a conventional tractor pulling a towable grading implement according to one embodiment of the present invention, the implement being shown in a fully expanded state maximizing the working width of the implement via a pair of fold-down blade-carrying wings.
Figure 6:
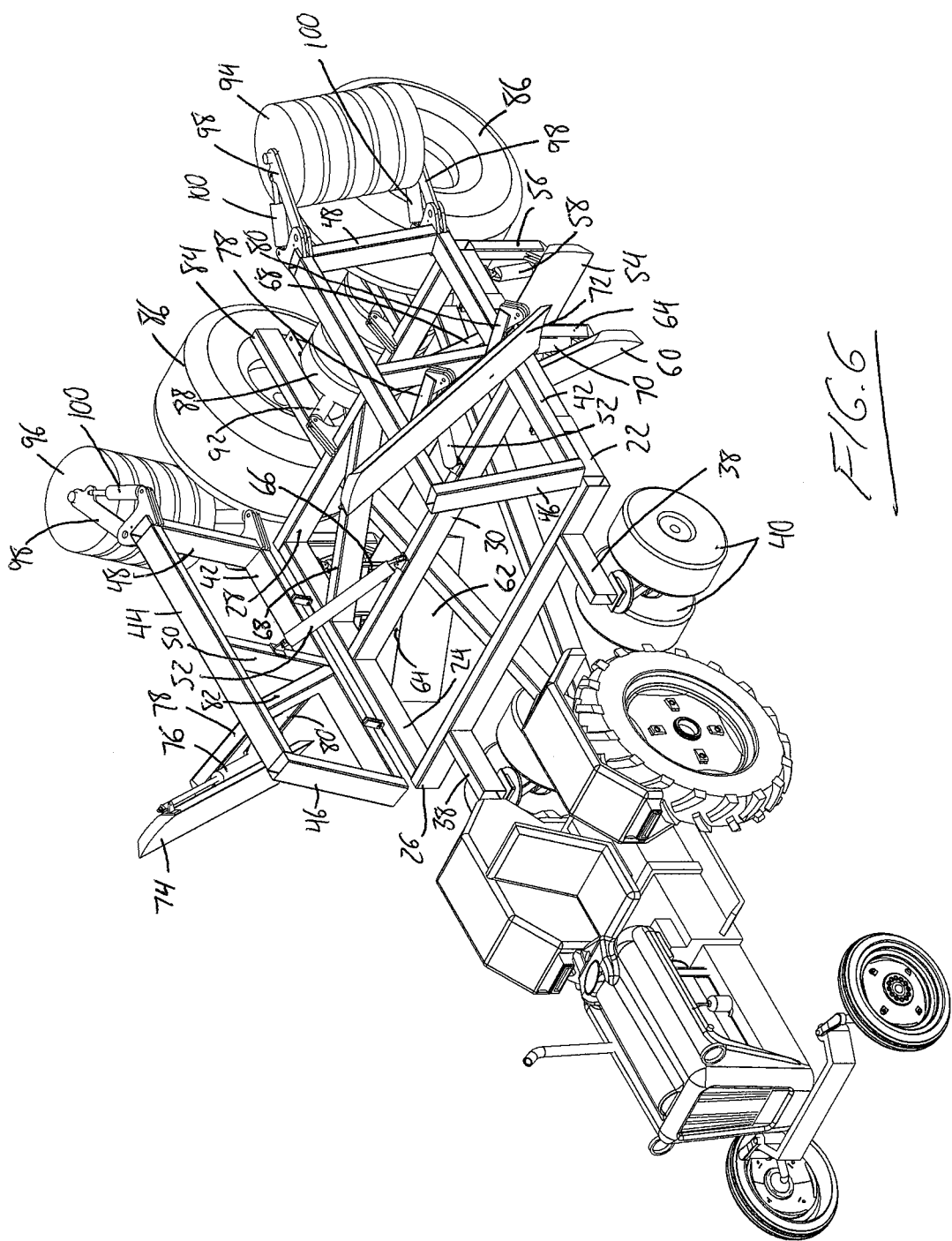
FIG. 6 is a front perspective view of the tractor and implement of FIG. 1, but with the implement in a collapsed state for transport and with storage tanks of the implement removed to reveal details normally obscured thereby.

FIG. 1 shows a conventional farm tractor 10 being used to pull a towable road grader implement 12 of one embodiment of the present invention. The implement features a frame 14 made up of a main center section 16, a left wing section 18 and a right wing section 20. A central longitudinal axis L horizontally bisects the central frame to imaginarily divide same into left and right halves, and also denotes a forward longitudinal direction F in which the implement is towed by the tractor 10, or another type of suitable tow vehicle. The main frame section 16 features an rectangular outer box frame assembled from two longitudinal side beams 22, 24 lying parallel to the central longitudinal axis L at symmetric positions laterally outward therefrom, and front and rear cross-beams 26 28 perpendicularly connecting the two side beams 22, 24 across the central longitudinal axis L. A center cross-beam 30 also perpendicularly connects the longitudinal side beams approximately halfway between the front and rear cross-beams 26, 28.

A trailer tongue 32 is defined by two converging beams 34 that lie symmetrically across the central longitudinal axis L, are fixed to the undersides of the three cross-beams 26, 28, 30, and converge forwardly from the front cross-beam 26 to carry a hitch coupler 36 at the leading end of the trailer tongue 32 where these converging beams 34 meet. In a conventional manner, the hitch coupler 36 is connectable to a cooperating hitch at the rear of the tractor 10 or other tow vehicle. On either side of the trailer tongue 32, a short stub beam 38 juts forwardly from the front cross-beam 26 to carry a respective pair of caster wheels 40 that are in rolling engagement with the ground to support the front end of the main frame section, and can swivel about a vertical caster axis. The box frame of the main frame section 16 denotes the outer perimeter thereof, with the left longitudinal side beam 22 thus defining an outer left side of the main frame section, while the right longitudinal side beam 24 likewise defines an outer right side of the main frame section 16.

Each wing section 18, 20 likewise features a rectangular box frame defining the outer periphery thereof, but the box frame of the wing sections are smaller than that of the main section. The box frame of each wing section features an inner longitudinal side beam 42 lying parallel and adjacent to the respective longitudinal side beam 22, 24 of the main section's box frame, and an outer longitudinal side beam 44 lying parallel to the inner longitudinal side beam 42 at a position spaced thereof by front, rear and center cross-beams of the 46, 48, 50 of the wing section. The cross-beams of each wing section are shorter than those of the main section, hence the reduced width of the wing sections relative to the main section.

Each wing section is hinged to the respective longitudinal side beam 22, 24 of the main section for pivoting relative thereto about a respective pivot axis that is parallel to the central longitudinal axis L. A respective linear hydraulic actuator 52 has one end pivotally pinned to a pair of lugs on the topside of the center cross-beam 30 of the main frame section near but outward from the central longitudinal axis L. The other end of the actuator 52 is likewise pivotally pinned to a pair of lugs on the topside of the wing section's center beam 50. Collapse of the linear hydraulic actuator 52 thus lifts the respective wing section into the raised storage position shown in FIGS. 6 through 10, where the wing section stands generally upward at the respective outer side of the main section. As shown, the storage position of the wing may tilt inwardly over the main frame section by a small acute angle. Extension of the hydraulic actuator 52 drives the respective wing section downwardly from the storage position into a lowered working position reaching further outwardly from the respective side of the main frame section, for example as shown in FIGS. 1 through 5, where each deployed wing section resides parallel to the main frame section to span horizontally outward therefrom.

At its underside, the main frame section 16 carries rear blade 54 in a position situated a short distance forwardly of the rear cross-beam 28 but rearwardly of the center cross-beam 30. The rear blade's length lies perpendicular to the central longitudinal axis L and spans fully between the two longitudinal side beams 22, 24 of main frame section, thus spanning fully thereacross. As perhaps best shown in FIG. 10, the rear blade may extend slightly beyond the outer sides of the main frame section. The rear blade 54 is carried by supports legs 56 depending downwardly from the rear corners of the main section's box frame. The rear blade may be pivotally coupled to these support legs for pivotal movement about a horizontal transverse axis perpendicular to the longitudinal axis L, thereby enabling adjustment of a pitch angle of the blade by linear hydraulic actuators 58 each coupled between the rear side of the rear blade and the respective longitudinal side beam 22, 24 of the main section.

Further forward of the rear blade 54, left and right inboard blades 60, 62 are carried by the main section on respective sides of the central longitudinal axis L so as to reside respectively adjacent the left and right outer sides of the main section. Each of these blades lies at an oblique angle relative to the longitudinal axis L so as to reach forwardly and outwardly therefrom. The angles of these two inboard blades thus diverge from one another in the forward working direction in a manner symmetric about the central longitudinal axis L. The outer end of each inboard blade (i.e. the end thereof furthest from the central longitudinal axis L) resides generally in-line with the respective longitudinal side beam 22, 24 of the main section's box frame. Each inboard blade 60, 62 stops short of the central longitudinal axis L so as to leave an open gap between the two inboard blades at the center of the implement. Each inboard blade is carried by two support legs 64, 66, one of which depends from the respective longitudinal side beam 22, 24 of the main section, and the other of which depends from a respective diagonal brace 68 of the main section that angles obliquely between this longitudinal side beam 22, 24 and the rear cross-beam 28 at a location behind the center cross-beam 30. Each inboard blade 60, 62 may be mounted for pitch adjustment by a respective linear hydraulic actuator 70 in the same manner as the rear blade.

For cooperation with a respective one of the inboard blades, each wing section carries a respective outboard blade 72, 74 at the underside thereof (i.e. the side that faces downwardly toward the ground in the deployed working position of the wing section, and that faces outwardly away from the center section the raised storage position). When each wing section is placed in a working position parallel to the main section, the length of the outboard blade 72, 74 lies parallel to that of the respective inboard blade 60, 62 in a position slightly leading the inboard blade in the forward working direction F. The lengths of the inboard and outboard blades overlap one another, whereby the outboard blade forms an effective extension of the inboard blade in a laterally outward direction from the main frame section at the same angle as the respective inboard blade. The length of the outboard blade exceeds a measurement of the wing frame between its inner and outer longitudinal beams 42, 44 in the direction of the outboard blade length. That is, a measurement of the wing section made at the same angle to the center longitudinal axis as the outboard blade length is lesser than the outboard blade length itself.

Each outboard blade 72, 74 is extendable and retractable in a direction parallel to its length by a respective linear hydraulic actuator 76 operating between the outboard blade and respective support legs 78, 80 on which the blade is slidably carried for movement back and forth thereacross. One of these support legs 78 of which depends downward from the outer longitudinal side beam 44 of the wing section, while the other support leg 80 depends downward from a diagonal brace 82 of the wing section that obliquely spans from the outer longitudinal beam 44 of the wing section to the inside corner at which the center cross-beam 50 an inner longitudinal side beam 42 of the wing section intersect. To enable the sliding motion of the extendable/retractable outboard blade, the support legs 78, 80 and the backside of the outboard blade having cooperating slide features thereon (not shown) by which the blade can slide back and forth across the support legs by extension and collapse of the actuator 76. The drawings show the outboard blades 72, 74 in extended positions reaching outwardly beyond the outer longitudinal side beams 44 of the wing sections, while the inner end of each outboard blade lies in front of the respective inboard blade near the outer end thereof, thus maintaining a small amount of overlap between these two blades. The two slightly overlapped blades thus maximize the overall effective blade length from the inner end of the inboard blade to the outer end of the outboard blade. In this fully expanded state of the grader, with both wing sections folded down and both outboard blades extended, the overall working width of grader is thus at a maximum.

If the width of road to be graded is less than this maximum attainable blade span, then the outboard blades can be retracted inwardly, thereby sliding the inner end of the outboard blades further inward toward the center longitudinal axis L of the implement along the inboard blades. The fully collapsed state of the outboard blade actuators 76 preferably draws the outer ends of the outboard blades to positions near, at or slightly inward from the outer longitudinal side beams 44 of the wing sections. In this intermediate state of the implement, the total effective width of the implement is generally the distance between the outer longitudinal side beams 44 of the two wing sections, as opposed to in the fully expanded state where the total width of the implement is that measured between the outer ends of the extended outboard blades. In the fully collapsed state of the implement in FIGS. 6 through 10, the total width of the implement is further reduced by the folding up of the two wing sections, thereby minimizing the footprint of the implement for transport thereof between road grading operations.

To grade a road, the implement is towed to the road work site in the collapsed transport state, and on arrival at the road work site, the wing sections are deployed to bring the implement into its intermediate state. Depending on the road width, the outboard blades can optionally be extended partially or fully outward toward the fully extended state in order to increase or maximize the working width of the implement. The grader thus has a greater number of expandable/collapsible stages than prior graders that are either fixed width, or have extendable blades carried on a single-section frame structure of fixed footprint, thereby providing greater flexibility and improved balance between a minimally-sized transport state and an expanded state of substantial and adjustable working width. In one embodiment, the total effective blade width of the implement with the wings down and the outboard blades retracted is 18 feet, while extension of the outboard blades increases the total effective blade with to 24 feet, thereby enabling grading of typical rural roads that normally measure 18 to 24 feet in width. With the two inboard blades spaced apart across the center of the implement, the rear blade spanning across the central gap between the inboard blades, and the outboard blades extending outward from the inboard blades in leading, overlapping relation to the inboard blades, a typical rural road can be graded in a single pass, with the adjustable rear blade controlling the crown of the road, and the cooperating inboard and outboard blades acting on the slopes sides of the road on opposite sides of the crown. The inclination angle of the inboard outboard blades can be adjusted to the necessary grade slope, for example using known means from the prior art (not shown).

The rear cross-beam 28 of the main section has rearwardly reaching tail beams 84 jutting outwardly therefrom, each tail beam having a respective ground wheel 86 rotatably coupled thereto in order to rollingly support the rear end of the frame on the ground. A center packing roller 88 is also carried on the rear cross-beam 28 of the main frame section at a position between the two ground wheels 86 by a pair of pivotal legs 90 disposed on opposite sides of the center roller 88 to carry opposite ends of the roller's rotational shaft. A pair of linear hydraulic actuators 92 each have one end pivotally coupled to the rear cross-beam 28 and the other end pivotally coupled to a respective one of the pivotal legs 90, whereby expansion and collapse of the actuators causes raising and lowering of the center packing roller 88 about the shared pivot axis of these legs 90. The packing roller's rotational axis and the shared pivot axes of the two legs 90 lie parallel to the rear cross-beam of the center section.

The left and right wing sections respectively feature left and right packing rollers 94, 96 that are likewise carried on the rear cross-beams 48 of the wing sections by respective pairs of pivotal legs 98, and are likewise raisable and lowerable relative to the folded-down working positions of the wing sections by respective linear hydraulic actuators 100 operable between these pivotal legs 98 and the wing sections of the frame. As shown, each packing roller may be a series of closely spaced packer wheels mounted on a common shaft. The left and right packing rollers occupy a substantially full width of the respective wing sections, while the central packing roller and ground wheels collectively span a substantially full width of the center section of the frame, thereby providing effective packing of the road surface that is graded by the arrangement of inboard, outboard and rear blades that lead these rear end packing rollers and ground wheels. The hydraulic linear actuators operable to raise and lower each packing roller relative to the respective frame section can increase the packing pressure applied to the graded road surface by applying extra down force on the rollers through extension of the actuators in downwardly acting directions relative to the frame sections. The illustrated use of an agricultural tractor to tow the implement allows for powering of all hydraulic components of the implement by the existing hydraulic system of the tractor.

Two storage tanks 102 are mounted atop the center frame section, for example one in front of the other with a generally cylindrical shape of each tank having its longitudinal axis oriented perpendicularly to the central longitudinal axis L. The length of each tank is centered on the center longitudinal axis L so as to split the tank length equally among the two sides of the main frame section. The outer diameter of each tank is approximately half the length of the central frame, whereby the two tanks overlie a substantially full length of the central frame section. The length of each tank also spans a majority of the center section's width, whereby the collective footprint of these two tanks occupies a majority of the central section's overall area, including areas directly overlying the inboard and rear blades of the center section of the frame. Each tank stores a supply of a liquid dust suppression agent therein, typically a brine solution using calcium chloride, magnesium chloride or sodium chloride, though other liquids may alternatively be used. The two tanks 102 are omitted in FIG. 6, but only for illustrative purposes in order to reveal other details of the implement that otherwise are not readily visible in other views.

An array of spray nozzles (not shown in the first embodiment) are mounted to the rear cross-beams of all three sections of the frame at discrete positions thereon that lie at regularly spaced intervals along these three beams when the two wing sections are deployed downwardly into their working positions. Each nozzle points downwardly from the respective rear cross-beam to direct its output spray downwardly toward the road surface over which the implement is towed during a grading operation. A dispensing system (not shown) features flexible fluid hoses routed between the storage tanks 102 and the spray nozzles via at least one pump, and suitable fittings and valving to selectively perform dispensing of the dust suppression agent from the storage tanks through the spray nozzles at the rear cross-beams of the frame during a grading operation. Accordingly, the location of the rear cross-beams behind the blade arrangement and in front of the packing rollers defines a dispensing area that trails the blades and leads the packing rollers, whereby dust kicked up from the road surface by the grading action of the blades is supressed by the immediate application of dust suppression agent to the graded road surface by the spray nozzles before the now wetted road surface is then packed by the rollers and ground wheels at the very rear of the implement.

In the meantime, the weight of the two large storage tanks occupying a substantial area of the main frame section, and the weight of the remaining supply of the dust suppression agent therein, serve as ballast to stabilize the machine and provide downforce to the blades at the underside of the frame to improve the implement's performance during grading operations. The length of each storage tank falls short of the center frame section's full width so as to leave some open space above the laterally outer areas of the central frame section, where the raised storage positions of the wing sections are therefore accommodated. FIGS. 7 and 8 show how the substantially full area of the central frame section is occupied by the combination of the storage tanks 102 and the folded up wing sections in the collapsed transport condition of the implement.

It will be appreciated that the number, size and particular placement of the storage tanks may be varied from those shown and described herein. Likewise, the particular positions, orientations and quantities of blades may be varied from those described and illustrated herein by still employing the advantageous configuration of a wing-carried, extendable/retractable outboard blade on one or both sides of the implement. For example, while the illustrated embodiment features two wings, one on each side, for single-pass grading operations, an alternate embodiment could feature a fold-down wing and corresponding extendable/retractable blade on only side, for use of the single wing on only one side of a road during multi-pass grading operations.

FIGS. 11 through 24 illustrate a second embodiment grading implement 212 that, like the first embodiment, is expandable and collapsible in width to switch between transport and working modes, and to adjust the effective working width of the implement within the latter mode. However, instead of pivotally mounted wing-style movable frame sections and extendable retractable outboard blades carried thereon, the second embodiment uses slide-out movable frame sections with non-extendable blades thereon to increase the working width of the implement.

Like in the first embodiment, the implement 212 features a frame 214 with a main center section 216 bisected by a central longitudinal axis L that imaginarily divides same into left and right halves, and also denotes a forward longitudinal direction F in which the implement is towed by the tractor 10 or other suitable tow vehicle. The main frame section 216 once again features a rectangular outer box frame assembled from two longitudinal side beams 222, 224 lying parallel to the central longitudinal axis L at symmetric positions laterally outward therefrom, and front and rear cross-beams 226, 228 perpendicularly connecting the two side beams 222, 224 across the central longitudinal axis L at the front and rear ends of the frame. A pair of center cross-beams 230a, 230b also perpendicularly connect the longitudinal side beams approximately halfway between the front and rear cross-beams 226, 228.

Once again, a trailer tongue 232 is defined by two converging beams 234 that lie symmetrically across the central longitudinal axis L, and converge forwardly from the front cross-beam 226 to carry a hitch coupler 236 at the leading end of the trailer tongue 232 where these converging beams 234 meet. In the present embodiment, the hitch tongue is pivotally coupled to a pair of hanging brackets that depend from the front cross beam 226 to allow the hitch tongue to pivot upward and downward around a horizontally transverse pivot axis lying perpendicularly to the central longitudinal axis L. Once again, a respective pair of caster wheels 240 are situated on either side of the trailer tongue in rolling engagement with the ground to support the front end of the main frame section. The box frame of the main frame section 216 again denotes the outer perimeter thereof, with the left longitudinal side beam 222 thus defining an outer left side of the main frame section, while the right longitudinal side beam 224 likewise defines an outer right side of the main frame section 216.

Figure 14:
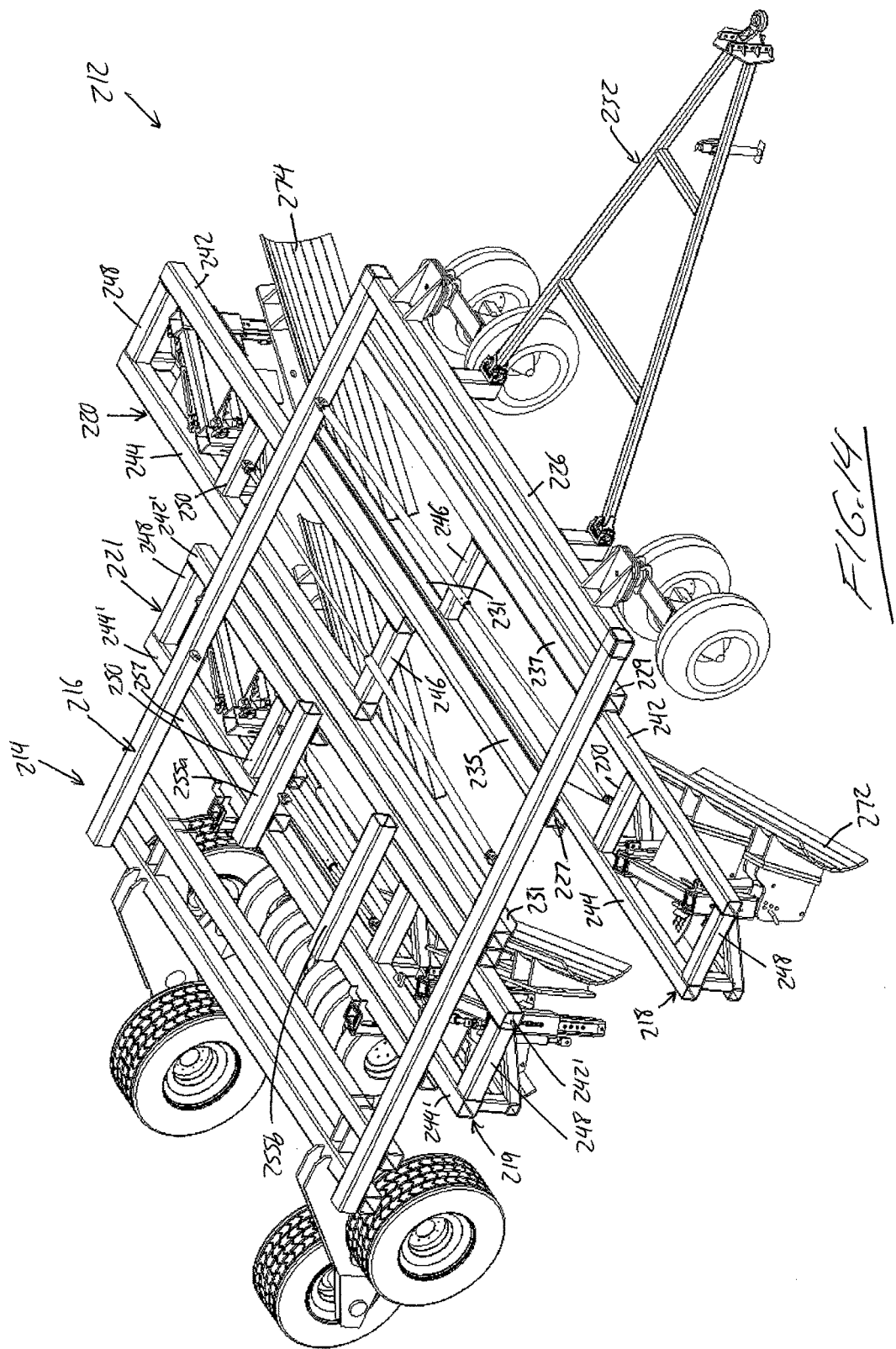
FIG. 14 is a front perspective view of the implement of FIG. 11 in its expanded state of maximized working width.

Instead of foldable wing sections, the second embodiment frame features first and second slide-out frame sections 218, 220 for carrying the outboard blades 272, 274. As shown in FIGS. 14 through 16, the first slide-out section 218 is operable to reach laterally outward from the right side of the main frame section 216 near the front end of the frame, and the second slide-out section 220 is likewise operable to reach laterally outward from the left side of the main frame section 216 in a position offset rearwardly behind the first slide-out section 218. The first outboard blade 272 is carried at the underside of the first slide-out frame section 218, and thus slightly leads the second outboard blade 274 in the forward longitudinal direction F. In the illustrated example, the outboard blades 272, 274 of the second embodiment are non-extendable, instead relying solely on lateral extension and retraction of the slide-out frame sections 218, 220 between deployed working positions and retracted storage positions to control the adjustable working width of the machine. However, it will be appreciated that extendable outboard blades extendable beyond the outer ends of the slide-out frame sections may be used to enable an even greater achievable working width of the implement.

Each slide-out section 218, 220 features a rectangular box frame defining the outer periphery thereof. The box frame of each slide-out section features a front beam 242 lying perpendicular to the longitudinal side beams 222, 224 of the main section's box frame, and a rear beam 244 lying parallel to the front beam 242 at a position spaced rearwardly thereof by inner, outer and mid cross-beams 246, 248, 250 of the slide-out section. The front and rear beams 242, 244 of each slide-out section are notably greater in length than the shorter cross-beams thereof, thus giving each slide-out frame section an elongated shape in the transverse direction of the main frame section 216. In the illustrated embodiment, the front and rear beams of each slide-out section are generally equal in length to the cross-beams 226, 228, 230a, 230b of the main frame section, whereby the length of each slide-out section 218, 220 is generally equal to the width of the main frame section 216.

At a location situated intermediately of the center cross-beams 230a, 230b of the main frame section and the front cross-beam 226, an additional mid-front cross-beam 227 spans perpendicularly between the two longitudinal side beams 222, 224 of the main frame section at the undersides thereof. Further forwardly of the mid-front cross-beam 227, and just behind the front cross-beam 226, an additional near-front cross-beam 229 lies parallel to the other cross-beams of the main frame section and likewise spans between the two longitudinal side beams 222, 224 at the undersides thereof.

Figure 11:
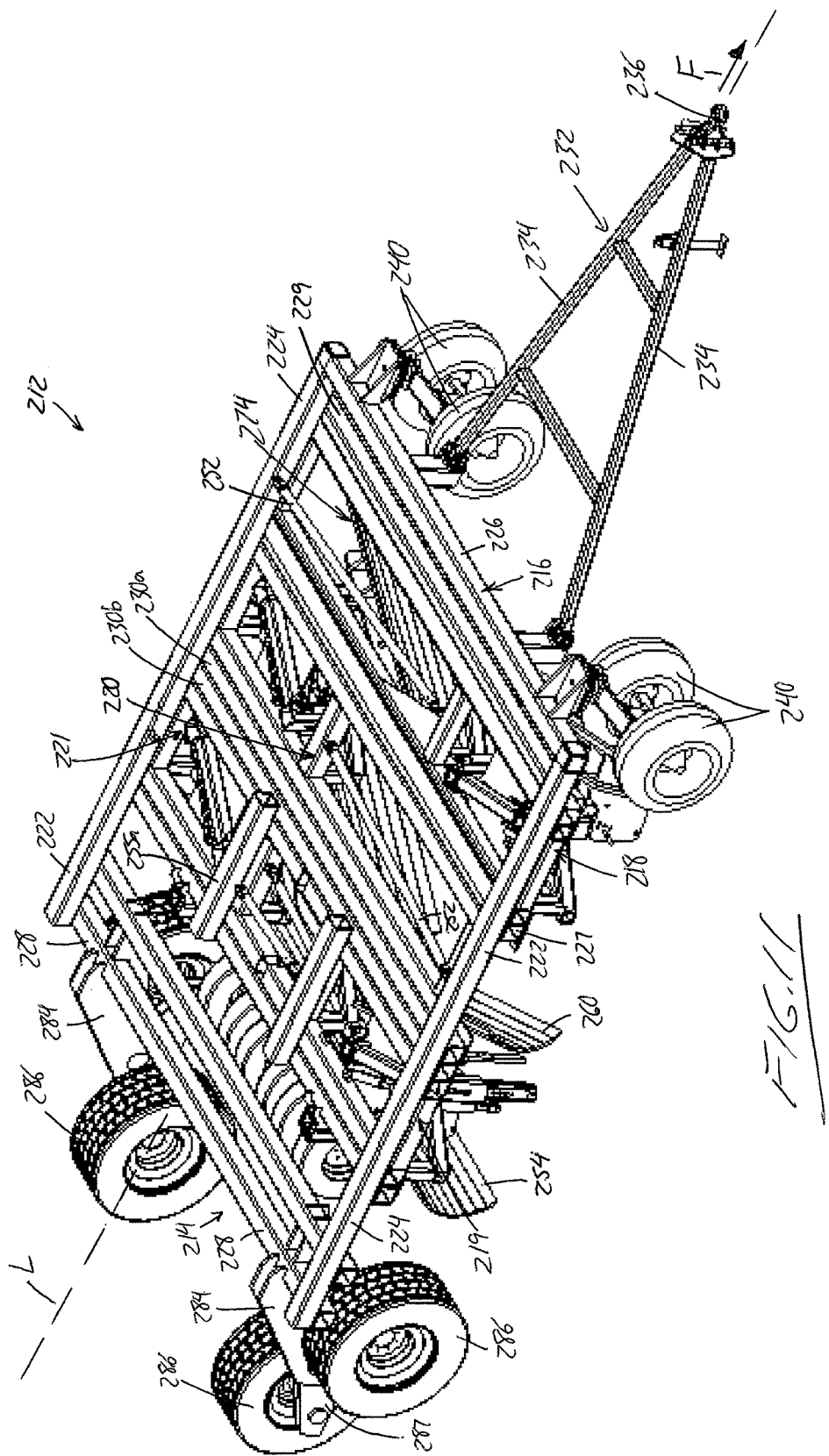
FIG. 11 is a front side perspective view of a second embodiment grading implement in a collapsed state of minimum width that is achieved by retracting of a set of blade-carrying slide-out frame sections.
Figure 12:
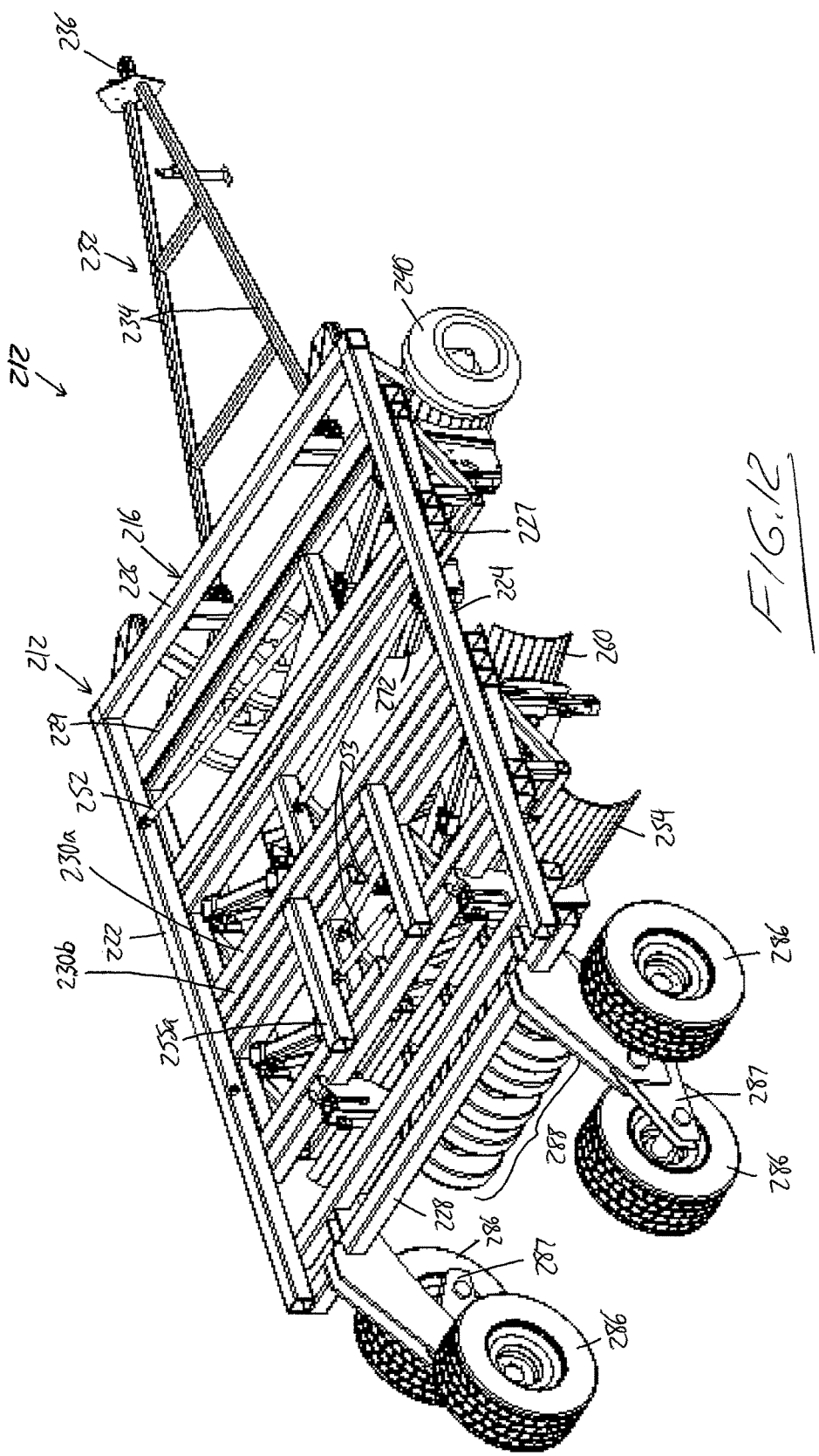
FIG. 12 is a rear side perspective view of the implement of FIG. 11.
Figure 13:
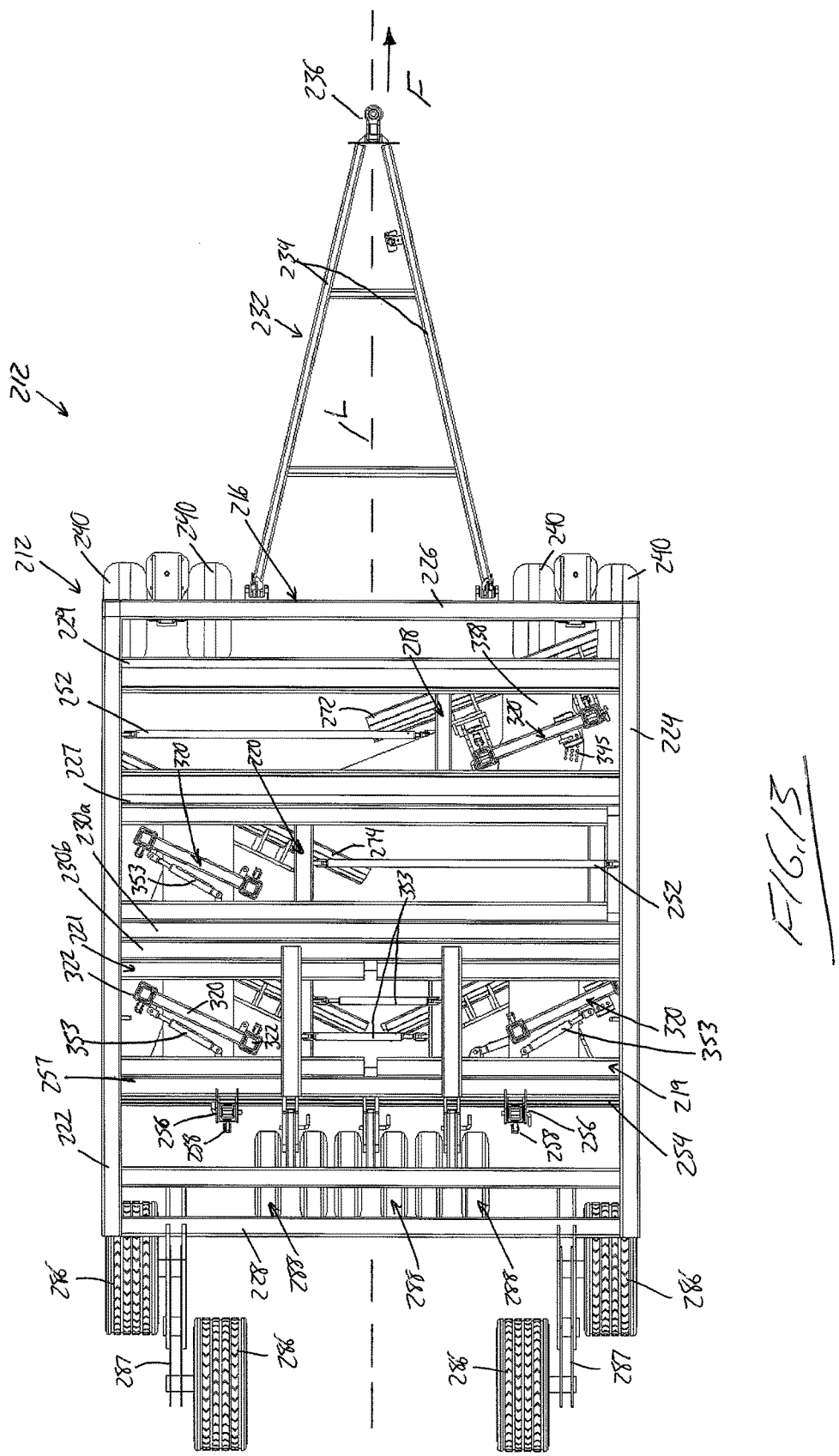
FIG. 13 is an overhead plan view of the implement of FIG. 11.

The first slide-out section 218 is received between the mid-front and near-front cross-beams 227, 229 of the main frame section 216. A pair of support flanges 231, 233 respectively project forwardly and rearwardly from the undersides of the mid-front and near-front cross-beams 227, 229 and span the full lengths of these cross-beams across the main frame section 216. These support flanges 231 233 slidably support the front and rear beams 242, 244 of the first slide-out section 218. Accordingly, the first slide-out section is slidable back and forth in the transverse direction of the main frame section 216 between a retracted storage position lying entirely within the footprint of the main frame section 216, as shown in FIGS. 11-13, and a deployed working position reaching laterally outward from the right side of the main frame section, as shown in FIGS. 14-16. These support flanges 231, 233 and the cross-beams 227, 229 to which they are affixed thus form a first guide-track that lies transversely of the main frame section to guide the lateral extension and retraction of the first slide-out section 218. As shown, top flanges 235, 237 may project forwardly and rearwardly from the topsides of the mid-front and near-front cross-beams 227, 229 to overlie the front and rear beams 242, 244 of the first slide-out section 218 so as to further constrain same to linear motion in the transverse direction of the main frame section within a closed channel bound between the bottom support flanges 231, 233 and matching top flanges 235, 237. Each flange may be formed by an elongated bar or plate welded to the respective cross-beam of the main frame section, which like all the other beams of the described frame structure may be defined by lengths of rectangular metal tubing.

The front and rear beams of the second slide-out frame section 220 are likewise slidably disposed atop another set of support flanges 231, 233 projecting forwardly and rearwardly from the undersides of the forward-most center cross beam 230a and the mid-front cross beam 22, thereby forming a second guide track that constrains the second slide-out frame section to linear displacement in the transverse direction of the main frame section between the center cross beams 230a, 230b and the mid-front cross beam 227. A respective linear hydraulic actuator 252 drives extension and retraction of each slide-out frame section 218, 220 between the deployed working position and retracted storage position. The actuator for the first slide-out section 218 has one end one end pivotally pinned to a pair of lugs on the left longitudinal side beam 222 of the main frame section, and the other end pivotally pinned to a pair of lugs on the mid cross beam 250 of the first slide-out section, whereby extension of the actuator 252 extends the first slide-out section 218 laterally outward from the right side of the main frame section. Likewise, the actuator for the second slide-out section 220 has one end one end pivotally pinned to a pair of lugs on the right longitudinal side beam 224 of the main frame section, and the other end pivotally pinned to a pair of lugs on the mid cross beam 250 of the second slide-out section 220, whereby extension of the actuator 252 extends the second slide-out section laterally outward from the left side of the main frame section 216.

The respective outboard blades 272, 274 of the slide-out sections 218, 220 are carried near the outer ends thereof, specifically at a location between the mid cross beam 250 and the outer cross beam 248 that resides furthest outward from the main section 216 in the deployed working state of the slide out section. Accordingly, full extension of the actuators 252 places each outboard blade 272, 274 in its most extended position furthest outboard of the main frame section 216 to achieve the maximum working width of the implement when both slide-out sections are fully extended. Partial extension of either actuator 252 may be used to set the respective outboard blade at an intermediate position between the storage position and fully extended position.

In the illustrated configuration of the second embodiment, the inboard blades 260, 262 are also mounted to movable slide-out frame sections 219, 221 to enable adjustment of inboard blade positions in the transverse direction of the main frame section. However, the third and fourth slide-out frame sections 219, 221 that carry the inboard blades are notably shorter than the first and second slide-out frame sections 218, 220 in the transverse direction of the main frame section, each spanning slightly less than half the width of the main frame section unlike the full-width first and second slide-out sections 218, 220. Therefore, unlike the full-width first and second slide-out sections that must be offset from one another in the longitudinal direction of the main frame section, the third and fourth slide-out sections 219, 221 are not offset from one another in the longitudinal direction, and instead lie in alignment with one another across the central longitudinal axis L of the main frame section 216. Both rear slide-out sections 219, 221 thus reside in the same space between the rearmost center cross beam 230b of the main frame section 216 and a mid-rear cross beam 257 thereof that lies parallel to the other cross-beams of the main frame section at an intermediate location between the center cross beams 230a, 230b and the rear cross beam 228. The mid-rear cross beam 257 and rearmost center cross beam 230b features the same forwardly and rearwardly projecting support flanges 231, 233 as described above to slidably support the rear slide-out sections for movement between their deployed working positions and retracted storage positions, whereby this cooperation of the support flanges and cross beams forms a third guide track for the back and forth linear motion of the third and fourth slide-out sections 219, 221 in the transverse direction of the main frame section.

Trailing the first and second slide-out sections 218, 220 in the longitudinal direction of the main frame section, the third and fourth slide-out sections 219, 221 are also referred to herein as the rear slide-out sections for convenience and brevity. Likewise, the first and second slide-out sections 218, 220 are sometimes referred to herein as front slide-out sections due to their closer proximity to the front end of the implement. The rear slide-out sections 219, 221 feature similar box-frame construction to the first and second slide-out sections, but featuring shorter front and rear beams 242', 244' and only two cross-beams 248, 250, namely outer cross beam 248 at the outer end of the slide-out section and intermediate cross-beam 250 at an intermediary position between the inner and outer ends of the front and rear beams 242', 244'. The respective blade 260, 262 of each rear slide-out section is carried at the underside thereof between the inner and outer cross beams 246, 248 thereof.

The rear slide-out sections 219, 221 are shorter than the front slide-out sections 218, 220 since it is the front slide-out sections and the outboard blades 272, 274 carried thereby that define the outer extents of the implement's overall working width at any given time, and so the rear slide-out sections 219, 221 need not be capable of reaching as far outward from the main frame section 216. Since lesser travel of the rear slide-out sections 219, 221 is necessary, shorter actuators 253 are used to extend and retract the rear slide-out sections between their retracted storage positions and deployed working positions. A left actuator mounting beam 255a resides near the central longitudinal axis L of the main frame section 216 to the left thereof in a position spanning longitudinally rearward from atop the rear-most center cross beam 230b to the mid-rear cross beam 257 thereof. Likewise, a right actuator mounting beam 255b is mounted in mirrored relation across the central longitudinal axis L from the left actuator mounting beam 255a to span between the rear-most center cross beam 230b and the mid-rear cross beam 257 at the topsides thereof.

The actuator for the third slide-out section 219 has one end pinned to the left actuator mounting beam 255a and the other end pinned to the mid cross beam 250 of the slide-out section 219, while the actuator for the fourth 221 slide-out section has one end pinned to the right actuator mounting beam 255b and the other end pinned to the mid cross beam 250 of the slide-out section 221. Outward extension of the third and fourth slide-out sections 219, 221 to the right and left sides of the main frame section 216 is thus effected by extension of the respective hydraulic actuators 253.

FIG. 16 best shows how in the fully extended positions of the front slide-out sections, the outboard blades 272, 274 reside entirely outboard from the space bound by the box frame of the main frame section, while FIG. 13 shows how in the retracted position of each of the four slide-out sections, the respective blade resides entirety within the footprint of the main frame section. The ability to displace the rear slide-out sections 219, 221 slightly outwardly from the main frame section 216 enables extension of the inboard blade positions slightly beyond the outer sides 222, 224 of the main frame section 216 to maintain overlap in the transverse direction of the implement between the outboard and inboard blades when the front slide-out sections are fully extended, as shown in FIG. 16. The placement of the shorter rear slide-out sections in alignment with one to move back and forth on a shared guide track rather than offsetting them from one another on separate respective guide tracks like the longer front slide-out sections encourages a more-longitudinally compact design of the overall frame, thus reducing the overall footprint and material requirements of the main frame section. Despite being longitudinally offset from one another, the outboard blades are nonetheless arranged in forwardly diverging relation to one another, whereby the same general blade layout of the first embodiment is achieved, where two forwardly diverging, laterally spaced outboard blades that lead and overlap a pair of forwardly diverging, laterally spaced inboard blades that are trailed by a purely transverse rear blade.

However, unlike the wings of the first embodiment that swing up and down out of and into the plane of the main frame section, the movable frame sections of the second embodiment undergo planar sliding motion in a plane parallel to and just beneath the longitudinal cross beams 222, 224 of the main frame section 216. The second embodiment also differs from the first in that both the inboard blades and outboard blades are carried on movable frame sections for greater blade adjustability over the entirety of the implement. Like with the front slide-out sections, the rear slide-out sections can be partially extended toward their fully deployed positions, thereby allowing flexible adjustability between fully retracted positions nearest the central longitudinal axis at the center of the machine and fully extended positions furthest therefrom, and also to any intermediary degree of extension therebetween. Optimal control over the relative positions and orientations of all the blades are thus provided for maximum user control.

At its underside, the rear-mid cross-beam 257 of the main frame section 216 carries the rear blade 254 in a position situated forwardly of the rear cross-beam 228. The rear blade's length lies perpendicular to the central longitudinal axis L and spans fully between the two longitudinal side beams 222, 224 of main frame section 216, thus spanning fully thereacross. The rear blade 254 is carried by telescopic supports legs 256 depending downwardly from the rear-mid cross-beam of the main frame section, and a respective pair of linear hydraulic actuators 258 coupled between the upper and lower portions of the telescopic support legs 256 enable height adjustment of the rear blade relative to the mid-rear cross beam.

The rear cross-beam 228 of the main section has a pair of rearwardly reaching wheel supports 284 jutting outwardly therefrom, each wheel support having a respective pair of longitudinally offset ground wheels 286 coupled thereto via a walking beam 287 in order to rollingly support the rear end of the frame on the ground. As shown in the drawings, an additional near-rear cross-beam may be included between the mid-rear cross beam 257 and rear cross beam 228 to further reinforce the main frame section and provide additional mounting strength to the wheel supports 284.

A set of center packing rollers 288 are also carried on the main frame section near 216 the rear cross-beam 228 thereof, and in the illustrated example are mounted to the backside of the rear blade 254. The illustrated example features three such blade-carried packing rollers 288, each made up of a pair of packer wheels each rotatably supported on a shared wheel beam 289 carried by a respective wheel support bracket 291. By mounting the packing rollers to the rear blade, the same hydraulic actuators 258 control the height of both the rear blade 254 and the packing rollers 288 relative to the main frame section 216 to reduce the part count necessary to raise and the rear blade and packing rollers between ground-engaging working positions and elevated transport positions. With reference to FIG. 24, an upper front end of each wheel beam 289 is pivotally pinned to the wheel support bracket 291 at pivot 291a. Multiple pin holes 291b are provided in the wheel support bracket 291 at angularly spaced positions around the wheel beam's pivot point 291a. A wheel height lock pin 291c is selectively insertable through a selected one of these pin holes 291b and into a corresponding pin hole in the wheel beam 289 in order to lock an angle at which the wheel beam 289 resides relative to its pivotal connection to the wheel bracket 291, thus setting the height at which the packing roller 288 resides relative to the rear blade 254. This enables the sharing of the same height-control actuators 258 by the rear blade 254 and packing rollers 288 while still enabling relative height adjustment therebetween.

Each of the inboard and outboard blades is preferably supported on its respective slide-out frame section in the same manner, as described below with reference to FIGS. 17 through 22. Though FIGS. 17 through 19 specifically show the first slide-out frame section 218 and its respective outboard blade 272, the same description may be applied to the support of the other inboard and outboard blades on the other three slide-out frame sections.

With reference to FIGS. 17 to 19, the space between cross beams 248 and 250 of the slide-out section 218 defines a blade-carrying space of the slide-out section. Here, the respective blade 272 is suspended below the slide-out frame section by a blade holder 320 having a pair of telescopic uprights 322, each of which features an upper tube 324 and a smaller lower tube 326 whose upper end is telescopically received inside the upper tube 324. The upper tubes 324 of the two uprights 322 are perpendicularly and horizontally connected by top and bottom cross members 328, 330 located respectively adjacent the top and bottom ends of the upper tubes 324. The top cross member 328 resides within the blade carrying space of the slide-out frame section 218 between the two cross-beams 248, 250 thereof. A respective blade mounting bracket 332 is pivotally attached to the lower tube 326 of each telescopic upright 322 near the bottom end thereof by a horizontal pivot pin 334 lying parallel to the cross-members 328, 330. Each mounting bracket 332 is coupled to a backside of the blade via a respective standoff 336 that juts rearwardly from the convex backside of the blade to present a flat surface for interfacing with the front end of the mounting bracket 332, as described in more detail further below.

The blade holder 320 is supported on the slide-out section by a pair of identically shaped and aligned carrier plates 338, 340, the top one of which is welded to the underside of the front and rear beams 242, 244 of the slide-out section 218 at the blade carrying space between the cross beams 248, 250. The top cross member 328 of the blade holder 320 spans across the topside of the top carrier plate 338 so that the upper tubes 324 of the two telescopic uprights 322 reach downwardly from the top carrier plate 338 just outside the plate's perimeter at opposite sides thereof. As a result, each telescopic upright 322 resides adjacent a respective one of the cross beams 248, 250 that border opposite sides of the blade-carrying space of the slide-out section 218. The bottom cross member 330 likewise spans across the bottom carrier plate 240 at the underside thereof. Near the inner perimeter edges of the two aligned carrier plates 338, 340 (i.e. the perimeter edges thereof nearest the central longitudinal axis L of the main frame section 216 and furthest from the outer end of the respective slide-out section), the carrier plates 338, 340 are perpendicularly interconnected by a vertical pivot tube 342 in which a corresponding pivot shaft 344 of the blade holder 320 is received. The pivot shaft 344 spans between the top and bottom cross members 328, 330 of the blade holder, and is fixed thereto. As a result, the blade holder 320 is pivotally coupled to the carrier plates 338, 340 for swivelling of the blade holder 320 about the upright axis shared by the mated pivot tube 342 and pivot shaft 344.

The top and bottom carrier plates 338, 340 feature matching lock pin holes 345 arranged in an arcuate array around the upright axis of the pivot shaft 344. An upper lock flange 346 juts rearwardly out from the bottom of the top cross member 328, and a matching lower lock flange 348 juts rearwardly out from the top of the bottom cross member 330. The lock flanges 346, 348 have matching pin holes 350 therein that resides at the same radial distance from the upright axis of the pivot shaft 344 as the arcuate array of holes 345 in the top and bottom carrier plates 338, 340. Accordingly, to lock the blade holder 320 at a selected yaw angle about the pivot shaft 344, a yaw lock pin 352 is insertable downwardly through the aligned pin holes 345, 350 in the carrier plates 338, 340 and lock flanges 346, 348. When the lock pin 352 is withdrawn from the aligned pin holes 345, 350, the blade holder 320 is free for manual swivelling thereof about the upright axis of the pivot shaft 344 in order to set the blade holder 320 and attached blade at a new yaw angle. The blade holder is then locked at the selected yaw angle by reinsertion of the yaw lock pin 352.

FIG. 19A shows the blade at a zero yaw angle lying parallel to the front and rear beams 242, 244 of the slide-out frame section 218, while FIG. 19B shows the blade at an oblique yaw angle sloping rearwardly inward, i.e. placing the inner end of the blade in trailing relation to the outer end thereof in the forward working direction of the implement; Adjusting the measure of this oblique yaw angle thus controls the angle of divergence between the inboard or outboard blades on the opposite sides of the central longitudinal axis.

As best seen in FIG. 18, a support beam 354 spans across the underside of the bottom carrier plate 340 along the rear perimeter edge thereof to better reinforce the stationary position thereof relative to the top carrier plate 238, which in turn is welded to the front and rear beams 242, 244 of the slide-out section 218. The support beam 354 is carried on the slide-out section 218 by vertical supports 356 and angled braces 358 fixed to the cross-beams 348, 350 of the slide-out section 218 at the opposite ends of the support beam 354.

The telescopic uprights 322 of the blade holder 320 enable both height adjustment and roll angle adjustment of the blade 272. A length of each telescopic upright is normally held static by a respective height lock pin 360 passed through a selected one of a vertically arrayed series of pin holes 362 in a side of the lower tube 326 of the telescopic upright 322 via an aligned vertically-elongated slot-shaped opening 364 in a matching side of the upper tube 324, as best shown in FIGS. 18 and 20. The height lock pin 360 blocks downward sliding of the lower tube 326 past the point at which the lock pin 360 abuts the bottom end of the slot 364, thus preventing extension of the telescopic upright 322. While the illustrated embodiment uses an elongated slot-shaped opening 364 in the upper tube, a series of individual pin holes may alternatively be employed.

FIGS. 18 and 20A show the blade at its greatest attainable height, where rear upper edges of the mounting brackets 332 reside just below the bottom ends of the upper tubes 324 of the telescopic uprights 322. To lower the blade to a lesser height, both height lock pins 360 are removed, and a pair of hydraulic linear actuators 366 located in front of the two telescopic uprights 322 are synchronously extended. The top end of each actuator 366 is pivotally pinned to a pair of lugs at the front side of the top tube 324 of the respective upright 322, while the bottom end of the actuator 366 is pivotally pinned to the respective mounting bracket 332 at a hollow space situated between two side plates 332a of the bracket. Accordingly, this simultaneous extension of the two actuators 366 drives the two mounting brackets 322 downwardly from the slide-out frame section 218 in synchronous fashion, thus adjusting the height of the blade 272 by extending the two uprights 322 to the same equal length without affecting the roll angle of the blade. FIG. 20A shows the blade in a fully raises state, while FIG. 20B shows the blade in a lowered state.

Figure 22A:
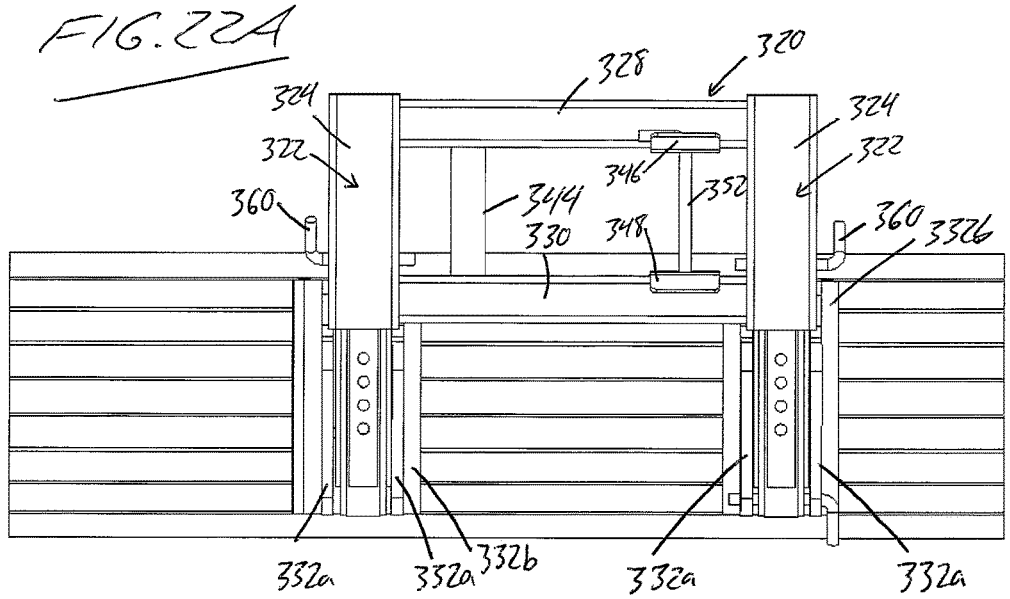
FIGS. 22A and 22B are rear elevational views of the blade holder and blade of the blade-carrying slide-out frame section of FIG. 17 with the blade situated at different roll angles.

During this height adjustment of the blade, the pitch angle of the blade is held static at a selected angle by a pair of pitch lock pins 370, each of which is engaged with a pin hole in the side of the lower tube 326 of one of the telescopic uprights 322 via one of a number of selectable pin holes 372 in the side plates 322a of the respective mounting bracket 332. Once the blade has been set at a desired height relative to the frame of the implement by synchronous operation of the actuators 366, the height lock pins 360 are re-inserted, and the pitch angle of the blade can then be adjusted by removing the pitch lock pins 370. With the height lock pins 360 in place to prevent extension of the telescopic uprights 322, the removed state of the pitch lock pins 370 means that extension of the actuators 366 now causes the mounting brackets 322 to pivot downwardly about their pivot pins 334, thus pitching the blade downward. FIG. 21A illustrates the blade in a non-pitched state corresponding to selection of one of the pin holes 372, while FIG. 22A illustrates a downwardly pitched position of the blade corresponding to a different one of the pin holes 372 that are angularly spaced about the pivot pin 334 at a radial distance upward therefrom.

Figure 22B:
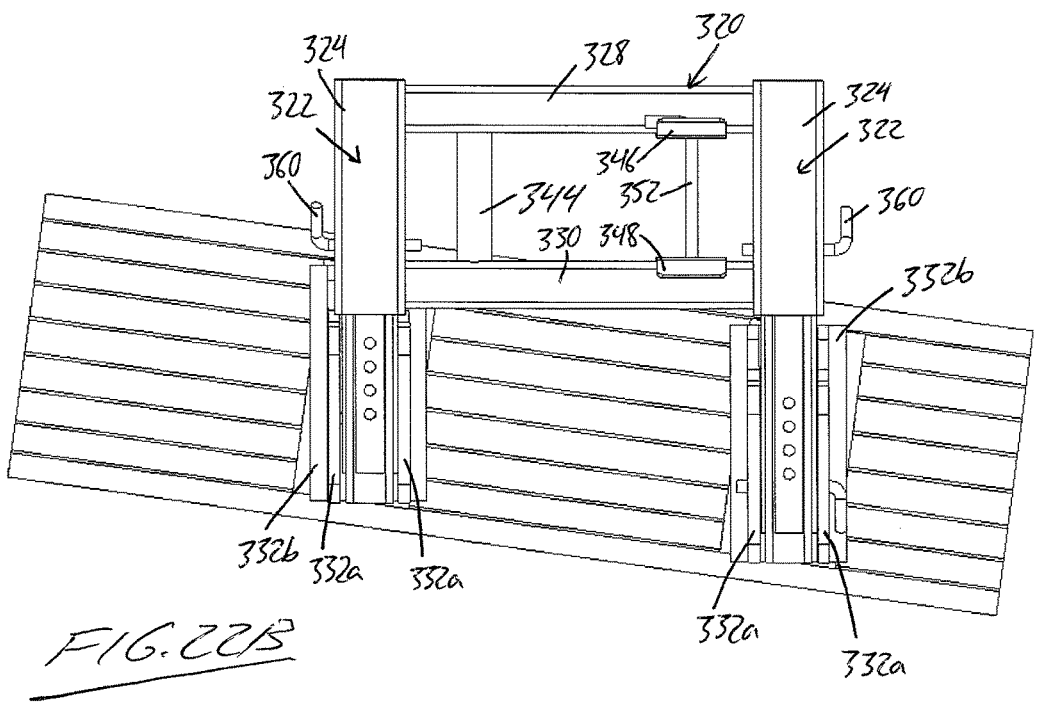
Figure 23:
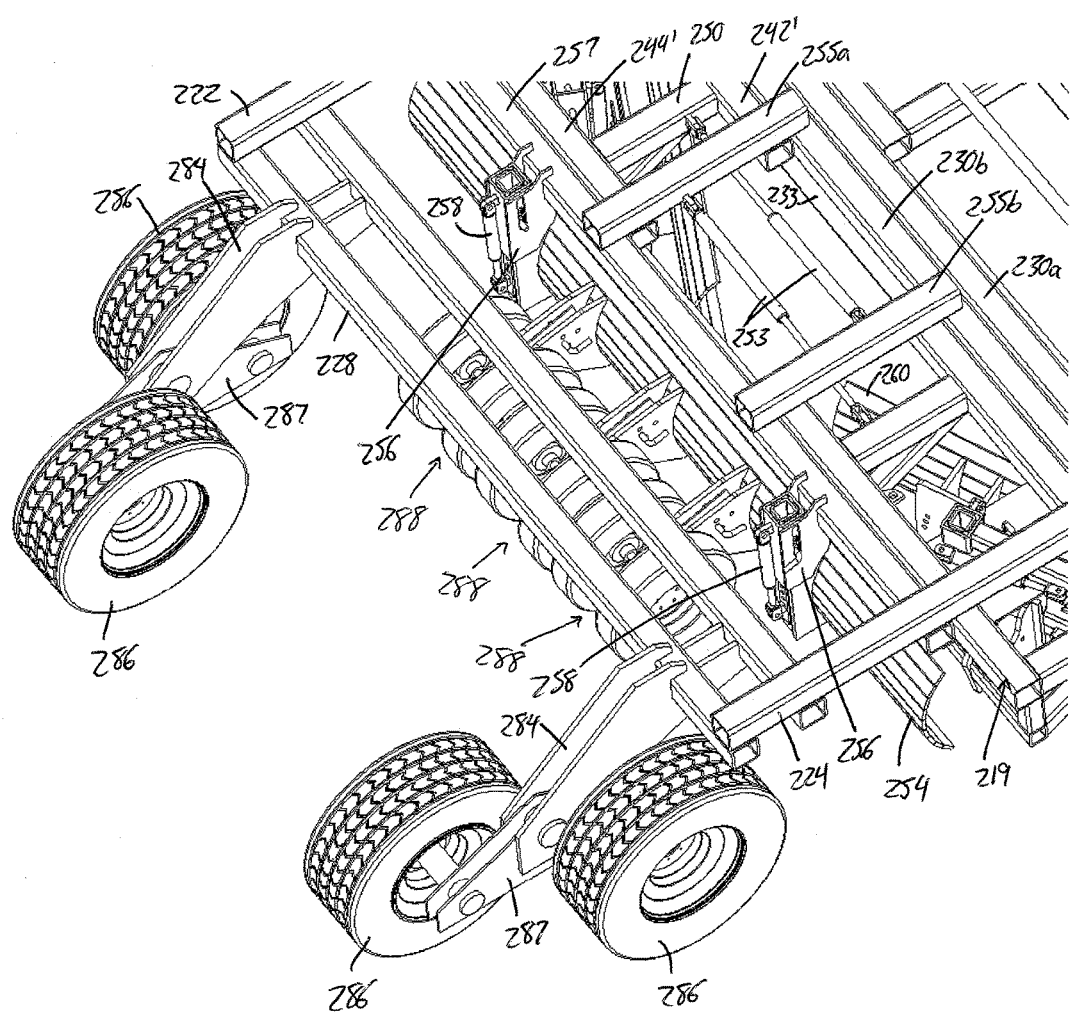
FIG. 23 is a partial top rear perspective view of the implement of FIG. 17 at a rear end thereof showing a set of packer wheels trailing behind a rearmost blade of the implement.

The same actuators 366 used for the height and pitch adjustment of the blade 272 are also used to adjust the roll angle of the blade 272. With the pitch lock pins 270 in place to hold the pitch angle of the blade static, differential operation of the two actuators 366 is used to lower one end of the blade relative to the other. This is illustrated by comparison of FIGS. 22A and 22B. FIG. 22A shows the blade at in a level orientation, i.e. zero roll angle, where the bottom working edge of the blade is parallel to the frame of the implement, i.e. representing a horizontal orientation when the implement is conveyed over horizontal ground. FIG. 22B shows the blade at an inclined roll angle where one end of the blade is higher than the other, as is required in a typical grading operation to provide the road with a cross-slope to encourage rainwater drainage off the roadway. To create an inclined blade orientation, one could remove one of the height lock pins 360 (while leaving the pitch lock pins 370 in place) and extend or collapse the respective actuator 366 and thus lower or raise the nearest end of the blade 272 while holding the other actuator and telescopic upright static with its respective height lock pin 360 in place. Alternatively, one could remove both height lock pins 360 and extend one actuator 366 while collapsing the other to raise one end of the blade 272 while lowering the other. The particular example in FIG. 22 involves extending the telescopic upright 322 on the right of the figure to lower the right end of the blade 272 while holding the left end of the blade static since it is already at or near its maximum raised position where interference between the blade mounting bracket 322 and the upper tube 324 of the respective telescopic upright 322 prevents further raising of the blade's left end.

To enable the roll-angle adjustment of the blade, relative lateral movement must be allowed to occur between the blade 272 and the mounting brackets 322 in a direction parallel to the cross-members 328, 330 of the blade holder 320. Each standoff 336 on the blade features a flat, rear-facing plate 336a carried by a pair of side plates that protrude from the backside of the blade, while each blade mounting bracket 322 features a corresponding flat, front-facing plate 332b. These front and rear facing plates 336a, 332b provide a planar contact interface between the mounting brackets and standoffs, at which relative sliding can occur within the shared plane of these flat contact surfaces. With reference to FIG. 19, at one of these two interfaces, the rear facing plate 336a of the standoff features a pin-shaped protuberance 374 which protrudes rearwardly through a corresponding slot 376 provided in the front face 332b of the respective blade mounting bracket 332. The elongated dimension of the slot 376 lies parallel to the cross members 328, 330 of the blade holder 320. This creates a slide-pivot joint with two degrees of freedom, allowing both relative rotation between the blade and mounting bracket about the axis of the pin-shaped protuberance 374, and relative linear displacement between the blade and mounting bracket along the elongated dimension of the slot 374. At the other interface, a purely pivotal joint 378 (i.e. non-sliding pivot-only joint) whose pivot pin lies parallel to the pin-shaped protuberance 374 of the slide-pivot joint provides only a single degree of freedom between the blade and the mounting bracket, namely relative rotation thereof about the pivot axis of pivot joint 378. This way, when the roll angle of the blade is adjusted, the end of the blade furthest from the pivot joint 378 can pivot up or down about the pivot axis, while the slide action of the slide-pivot joint 374, 376 accommodates relative displacement of the blade caused by the changing inclination thereof relative to the two mounting brackets 332, which are maintained at a constant, uniform horizontal spacing from one another by their attachment to the telescopic uprights 322 of the blade holder 320 that are rigidly interconnected by the cross members 328, 330 thereof.

By sharing the same actuators 366 for the height, roll angle and pitch angle adjustment of the blade, the number of hydraulic components (actuators, hoses, valves, etc.) is reduced, which is beneficial in terms of material and labour costs in manufacture of the implement, and in terms of maintenance and repair issues over the life of the implement. The user simply chooses the appropriate combination of lock pins to insert or remove according to the desired adjustment. To adjust height or roll of the blade, the height lock pins 360 are removed and the pitch lock pins 370 are used. To adjust the pitch, the height lock pins 360 are used and the pitch lock pins 370 are removed.

While the blade holder details illustrated in FIGS. 17 through 19 also provide hydraulic equipment efficiency by using manual adjustment of the yaw angle when the yaw angle lock pins 352 are removed, a yaw-adjustment actuator may alternatively be provided for this purpose. Such possibility is illustrated in the full implement drawing views of FIGS. 11 through 16, where the first slide-out section 318 features the above described yaw lock pin 352 cooperating with pin holes 345, 350 in the carrier plates 338, 340 and lock flanges 346, 348 of the blade holder 320, but the other three slide-out sections instead feature a hydraulic cylinder 353 connected between the rear beam 244 of the slide-out frame section and the top cross member 328 of the blade holder 320 so that extension and collapse of this actuator swivels the blade holder 320 about the upright axis of pivot shaft 344. The illustrated example includes both manually swivelled and mechanically swivelled blades solely for the purpose of illustrative efficiency, and it is preferred that the same manual or actuated operation be employed for all four of the inboard and outboard blades. Regardless of whether the yaw angle adjustment is manual or actuated, the other details associated with the height, pitch, roll, yaw adjustability are employed for each of the four inboard and outboard blades on their respective slide-out frame sections.

FIG. 25 shows the same second embodiment implement of FIGS. 11 through 24, but including components of the dust suppression system described above in relation to the first embodiment. A pump 400, for example mounted at the rear end of the main frame section 216 or at any other suitable static location thereon, is connected by suitable fluid conduits, e.g. flexible hoses 402, to both the storage tanks 202 and an array of discharge nozzles 404 that are mounted in downward spraying positions at or near the end of the main frame section so as to trail behind the packing rollers 288. In the illustrated example, the nozzles 402 are mounted on the rear cross beam 228 of the main frame section at regularly spaced intervals along the full length thereof to distribute the liquid dust suppression agent evenly across the road surface. In this scenario, unlike in the first embodiment, the dispensing area trails both the blades and the packing rollers, though the nozzles may instead be located further forward on the main frame section 216, for example at the mid-rear cross beam 257, so as to spray the dust suppression agent just behind the rear blade 254 and ahead of the packing rollers 288.

Other embodiments may also place nozzles on the slide frame sections, for example using pump-fed flexible hoses laid out with sufficient slack therein on the main frame section to accommodate movement of the nozzles when the slide out sections are extended and retracted. The illustrated example features two storage tanks, one of which is generally centered over the mid-front cross beam 227 so that its weight is distributed over the two front slide-out frames 218, 220 to apply downforce to the outboard blades 272, 274 carried thereby, while the second tank trails the first in a position generally overlying the rear slide-out sections 219, 221 to apply additional downforce to the inboard blades 260, 262. In the illustrated configuration, the rear tank is mounted atop the actuator mounting beams 255a, 255b to elevate the rear tank up off the cross beams to leave room for the actuators 253 of the rear slide out sections.

Since various modifications can be made in my invention as herein above described, and many apparently widely different embodiments of same made within the scope of the claims without departure from such scope, it is intended that all matter contained in the accompanying specification shall be interpreted as illustrative only and not in a limiting sense.

The invention claimed is:
1. A grading implement comprising:
  a frame comprising:
    a main section having a longitudinal direction in which the frame is arranged to be conveyed over a road surface;
    at least one movable section carried by the main section and movable relative thereto between a storage position and a working position, said at least one movable section reaching further laterally outward from said main section in the working position than in the storage position; and
  a blade arrangement comprising:
    at an underside of each movable section that faces downwardly toward the road surface in at least the deployed working position, a respective outboard blade carried by the respective movable section for working engagement of said blade with said road surface, said outboard blade being adjustably mounted to the respective movable section for selective adjustment between different relative blade positions relative to said movable section; and
    at least one inboard blade each mounted to the main section of the frame a position that is situated more inboard of the main frame section than each outboard blades each movable sections is deployed in the working position;
  wherein the respective outboard blade of each movable section of the frame is mounted thereto entirely separately and independently of each inboard blade mounted to the main section of the frame.

2. The implement of claim 1 wherein the at least one movable section of the frame comprises at least two movable sections that reach laterally outward from the main section on opposing sides thereof when deployed in the working positions.

3. The implement of claim 1 wherein the at least one movable section of the frame comprises first and second movable sections, and the blade arrangement comprises first and second outboard blades respectively carried by said first and second movable sections.

4. The implement of claim 3 wherein the first and second outboard blades are arranged to overlap with the at least one inboard blade when the first and second movable sections are deployed in the working positions.

5. The implement of claim 3 wherein the at least one inboard blade comprises third and fourth blades spaced apart from one across a central longitudinal axis of the main section and each residing adjacent a respective side thereof.

6. The implement of claim 5 wherein the at least one movable section comprises third and fourth movable sections on which the third and fourth blades are carried for movement of said third and fourth blades between stowed and extended positions corresponding to the storage and working positions of said third and fourth movable sections, said third and fourth blades reaching further laterally outward from said main section in the extended positions than in the stowed positions.

7. The implement of claim 6 wherein, in the working positions, the first and second movable sections reach further laterally outward from the main section than the third and fourth movable sections.

8. The implement of claim 6 wherein the first and second movable sections are more offset from one another in the longitudinal direction of the main section than the third and fourth sections.

9. The implement of claim 6 wherein the third and fourth movable sections are aligned with one another across the central longitudinal axis main section.

10. The implement of claim 3 wherein the first movable section leads the second movable section in the longitudinal direction of the main section.

11. The implement of claim 3 wherein the blade arrangement further comprises a rear blade carried by the main section of the frame at an underside thereof in a location trailing the at least one inboard blade and lying cross-wise to the main frame section over at least a majority width thereof.

12. The implement of claim 1 comprising one or more storage tanks mounted on the frame for containing a dust suppression agent therein, and a dispensing system comprising delivery lines connecting said storage tank to discharge points spaced across the main frame section at a dispensing area thereof for dispensing of said dust suppression agent through said discharge points to the road surface.

13. The implement of claim 12 wherein the dispensing area trails the blade arrangement in the longitudinal direction for dispensing of said dust suppression agent to the road surface after said blade arrangement has acted on said road surface.

14. The implement of claim 12 wherein at least one of the one or more storage tanks is mounted to the frame in a position overlying at least one blade of the blade arrangement.

15. The implement of claim 12 wherein the one or more storage tanks comprises a plurality of storage tanks spaced apart over an area of the frame to spread a collective weight of the dust suppression agent in said plurality of storage tanks over said over said area of the frame.

16. The implement of claim 12 wherein the one or more storage tanks include at least one storage tank carried on the main frame section in a position overlying the storage position of at least one of the movable sections of the frame.

17. The implement of claim 1 wherein each movable section of the frame comprises a slide-out section.

18. The implement of a claim 17 wherein each slide-out section is received in a respective guide-track of the main section of the frame for displacement back and forth along said guide-track in lateral direction transverse the longitudinal direction.

19. The implement of claim 18 each slide-out section comprises a rectangular frame, and the respective guide track comprises support flanges of the main section that lie transverse to the longitudinal direction thereof and on which opposing sides of the rectangular frame of the slide-out section are slidably disposed.

* * * * *